United States Patent
Zhang et al.

(10) Patent No.: US 10,263,673 B2
(45) Date of Patent: Apr. 16, 2019

(54) SIGNAL TRANSMISSION METHOD AND DEVICE

(71) Applicant: HUAWEI TECHNOLOGIES CO., LTD., Shenzhen, Guangdong (CN)

(72) Inventors: Leiming Zhang, Beijing (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/817,925

(22) Filed: Nov. 20, 2017

(65) Prior Publication Data

US 2018/0091198 A1 Mar. 29, 2018

Related U.S. Application Data

(63) Continuation of application No. PCT/CN2015/079430, filed on May 21, 2015.

(51) Int. Cl.
*H04B 7/0456* (2017.01)
*H04L 29/08* (2006.01)
*H04B 7/06* (2006.01)

(52) U.S. Cl.
CPC ......... *H04B 7/0456* (2013.01); *H04B 7/0478* (2013.01); *H04B 7/0617* (2013.01); *H04B 7/0639* (2013.01); *H04L 29/08* (2013.01)

(58) Field of Classification Search
CPC .. H04B 7/0456; H04B 7/0478; H04B 7/0617; H04B 7/0639; H04L 29/08
See application file for complete search history.

(56) References Cited

U.S. PATENT DOCUMENTS 7,272,408 B2 * 9/2007 Dalal ............... H01Q 1/246
343/795
9,306,646 B2 * 4/2016 Park ............... H04B 7/0456
(Continued)

FOREIGN PATENT DOCUMENTS

CN 203134986 U 8/2013
CN 104820216 A 8/2015

OTHER PUBLICATIONS

Extended European Search Report dated Mar. 29, 2018 in corresponding European Patent Application No. 15892214.6.
(Continued)

*Primary Examiner* — Kenneth T Lam
(74) *Attorney, Agent, or Firm* — Staas & Halsey LLP

(57) ABSTRACT

Embodiments of the present invention provide a signal transmission method and device. The method includes: determining, by a sending device, a target precoding matrix V, where $V = (H)^{-1} \cdot \tilde{H}$, H indicates a channel matrix between the sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance D between the sending device and the receiving device and an element spacing of an antenna of the receiving device; and sending, by the sending device, a signal to the receiving device according to the target precoding matrix V. Because $\tilde{H}$ meets a characteristic that $(\tilde{H}^H \cdot \tilde{H})$ or $(\tilde{H} \cdot \tilde{H}^H)$ is a diagonal matrix, a channel corresponding to $\tilde{H}$ can support multiple data stream transmission. Therefore, the signal transmission method and device provided in the embodiments of the present invention can support multiple data stream transmission.

20 Claims, 5 Drawing Sheets

100

A sending device determines a target precoding matrix V, where $V = (H)^{-1} \cdot \tilde{H}$, H indicates a channel matrix between the sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance D between the sending device and the receiving device and an element spacing of an antenna of the receiving device ~ S110

The sending device sends a signal to the receiving device according to the target precoding matrix V ~ S120

(56) References Cited

U.S. PATENT DOCUMENTS

2008/0240274 A1* 10/2008 Han .................... H04B 7/0417
                                                     375/260
2010/0290552 A1* 11/2010 Sasaki ................. H04B 7/0413
                                                     375/267

OTHER PUBLICATIONS

Tao Yang et al.: "A New Physical-Layer Network Coding Scheme with Eigen-Direction Alignment Preceding for MIMO Two-Way Relaying" IEEE Transactions on Communications, IEEE Service Center, Piscataway, NJ, USA, vol. 61. No. 3, Mar. 1, 2013, pp. 973-986, XP011504969.
Hi Roki Mori et al: "Throughput Improvement Technique Using Adaptive Control of Perturbation Interval for Downlink Multi-User MIMO Based on Vector Perturbation" IEICE Transactions on Communications, Communications Society, Tokyo, JP, vol. 1. No. 9, Sep. 1, 2012, pp. 2861-2869, XP001578271.
Illa Kolani et al: "Millimeter Wave for MIMO Small Antenna Systems and for Mobile Handset", Computer Science and Network Technology (ICCSNT), 2011, International Conference on, IEEE, Dec. 24, 2011, pp. 150-153, XP032161693.
International Search Report dated Feb. 2, 2016 in corresponding International Patent Application No. PCT/CN2015/079430.
International Search Report dated Feb. 2, 2016, in corresponding International Patent Application No. PCT/CN2015/079430, 3 pgs.

* cited by examiner

100

A sending device determines a target precoding matrix V, where $V=(H)^{-1}\cdot \tilde{H}$, H indicates a channel matrix between the sending device and a receiving device, $\tilde{H}$ indicates an equivalent channel matrix between the sending device and the receiving device, $(\tilde{H}^H \cdot \tilde{H})$ or $(\tilde{H}\cdot \tilde{H}^H)$ is a diagonal matrix, and $\tilde{H}$ is related to a transmission distance D between the sending device and the receiving device and an element spacing of an antenna of the receiving device ~ S110

The sending device sends a signal to the receiving device according to the target precoding matrix V ~ S120

FIG. 1

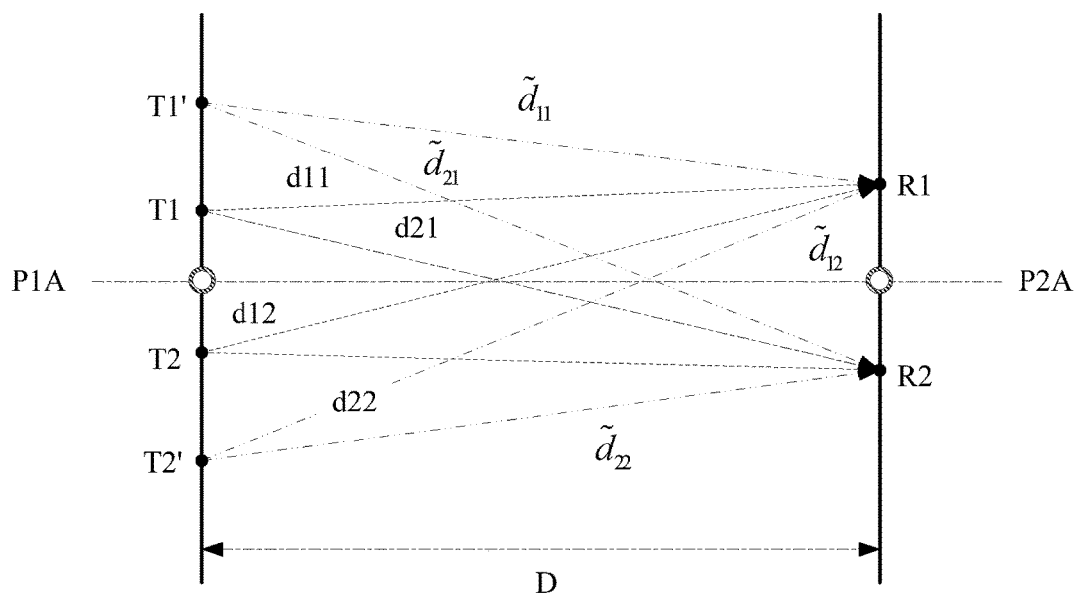

A receiving device determines a target precoding matrix V, where $V=(H)^{-1} \cdot \tilde{H}$, H indicates a channel matrix between a sending device and the receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance D between the sending device and the receiving device and an element spacing of an antenna of the receiving device ~ S210

The receiving device sends, to the sending device, an indication message used to indicate the target precoding matrix V, so that the sending device sends a signal to the receiving device according to the target precoding matrix V ~ S220

A receiving device determines a target precoding matrix V from N precoding matrices included in a preset codebook, where an $i^{th}$ precoding matrix $V_i$ in the N precoding matrices meets $V_i=(H_i)^{-1} \cdot \tilde{H}_i$, where $H_i$ indicates a channel matrix between a transmit end device and a receive end device, $\tilde{H}_i$ indicates an equivalent channel matrix between the transmit end device and the receive end device, $(\tilde{H}_i^H \cdot \tilde{H}_i)$ or $(\tilde{H}_i \cdot \tilde{H}_i^H)$ is a diagonal matrix, $\tilde{H}_i$ is related to a transmission distance between the transmit end device and the receive end device and an element spacing of an antenna of the receive end device, i is 1, 2, …, or N, and N is a positive integer ~ S213

The receiving device sends, to the sending device, an indication message used to indicate the target precoding matrix V, so that the sending device sends a signal to the receiving device according to the target precoding matrix V ~ S220

FIG. 6

SIGNAL TRANSMISSION METHOD AND DEVICE

CROSS-REFERENCE TO RELATED APPLICATION

This application is a continuation of International Application No. PCT/CN2015/079430, filed on May 21, 2015, the disclosure of which is hereby incorporated by reference in its entirety.

TECHNICAL FIELD

Embodiments of the present invention relate to the communications field, and more specifically, to a signal transmission method and device.

BACKGROUND

In a multiple-input multiple-output (Multiple-Input Multiple-Output, "MIMO" for short) system, it is assumed that a transmit end has N transmit antennas and a receive end has N receive antennas, and N is an integer greater than 1. In a multipath channel environment, a signal received by a receive end antenna may have been transmitted by different channels, and relevancy between the channels is relatively low. When the transmit end sends N data streams to the receive end, that is, when the N different transmit antennas send different data streams, each receive antenna of the receive end can obtain the N data streams by means of dividing. That is, multiple data stream transmission is implemented. For example, when N is equal to 2, dual data stream transmission is implemented.

When no obstacle exists between the transmit end and the receive end, a signal transmission path between the transmit end and the receive end is a straight-line propagation path without an obstacle. The straight-line propagation path without an obstacle may be referred to as a direct path.

In the MIMO system, when the direct path exists between the transmit end and the receive end, a channel rank decreases because channel relevancy increases, and a problem that multiple data stream transmission is not supported may occur. For example, a receive antenna of the receive end cannot obtain, by means of dividing, the N different data streams sent by the transmit end.

In the prior art, an antenna spacing is designed to meet a fixed relationship between the antenna spacing and a data transmission distance between the transmit end and the receive end, so as to decrease the channel relevancy, thereby implementing multiple data stream transmission. However, the antenna spacing is extremely difficult to design. In addition, the prior art is applicable to a scenario in which relative locations of the transmit end and the receive end are relatively fixed. If a relative movement exists between the transmit end and the receive end, for example, the receive end is a mobile terminal, the problem that multiple data stream transmission is not supported may still occur.

For the foregoing problem, a new signal transmission method needs to be put forward.

SUMMARY

Embodiments of the present invention provide a signal transmission method and device, so as to support multiple data stream transmission in a direct path condition.

According to a first aspect, a signal transmission method is provided, and the method includes:

determining, by a sending device, a target precoding matrix V, where $V=(H)^{-1} \cdot \tilde{H}$, H indicates a channel matrix between the sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance D between the sending device and the receiving device and an element spacing of an antenna of the receiving device; and sending, by the sending device, a signal to the receiving device according to the target precoding matrix V.

With reference to the first aspect, in a first implementation of the first aspect, the determining, by a sending device, a target precoding matrix V includes:

determining, by the sending device, the equivalent channel matrix $\tilde{H}$ according to the transmission distance D and the element spacing of the antenna of the receiving device; and determining, by the sending device, the target precoding matrix V according to H and $\tilde{H}$.

With reference to the first implementation of the first aspect, in a second implementation of the first aspect, the determining, by the sending device, the equivalent channel matrix $\tilde{H}$ according to the transmission distance D and the element spacing of the antenna of the receiving device includes:

determining, by the sending device, an equivalent element spacing of an antenna of the sending device according to the transmission distance D and the element spacing of the antenna of the receiving device; and determining, by the sending device, the equivalent channel matrix $\tilde{H}$ according to the equivalent element spacing of the antenna of the sending device, the element spacing of the antenna of the receiving device, and the transmission distance D.

With reference to the second implementation of the first aspect, in a third implementation of the first aspect, the determining, by the sending device, an equivalent element spacing of an antenna of the sending device according to the transmission distance D and the element spacing of the antenna of the receiving device includes:

determining, by the sending device, an equivalent element spacing $s_g$ of the antenna of the sending device according to the transmission distance D and the element spacing of the antenna of the receiving device, where $s_g$ meets the following formula:

$$s_g s_2 = \left(p + \frac{1}{\max(N_t, N_r)}\right) \frac{D\lambda}{\sin\theta \sin\omega},$$

where $s_2$ is the element spacing of the antenna of the receiving device, D is the transmission distance D, P is a constant, $\lambda$ is a wavelength, $N_t$ is a quantity of elements included in the antenna of the sending device, $N_r$ is a quantity of elements included in the antenna of the receiving device, $\theta$ indicates an angle between the antenna of the sending device and a projection that is of the antenna of the sending device and that is on a reference plane, and $\omega$ indicates an angle between the antenna of the receiving device and a projection that is of the antenna of the receiving device and that is on the reference plane.

With reference to any possible implementation of the first to the third implementations of the first aspect, in a fourth implementation of the first aspect, before the determining, by the sending device, the equivalent channel matrix $\tilde{H}$ according to the transmission distance D and the element spacing of the antenna of the receiving device, the method further includes:

receiving, by the sending device, an indication message that is sent by the receiving device and that is used to indicate the transmission distance D.

With reference to any possible implementation of the first aspect or the first to the fourth implementations of the first aspect, in a fifth implementation of the first aspect, before the determining, by a sending device, a target precoding matrix V, the method further includes:

receiving, by the sending device, an indication message that is sent by the receiving device and that is used to indicate the channel matrix H.

With reference to the first aspect, in a sixth implementation of the first aspect, the determining, by a sending device, a target precoding matrix V includes:

receiving, by the sending device, an indication message that is sent by the receiving device and that is used to instruct to determine the target precoding matrix V from a preset codebook, where the preset codebook includes N precoding matrices, and an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ is a diagonal matrix, $\tilde{H}_i$ is related to a transmission distance between the transmit end device and the receive end device and an element spacing of an antenna of the receive end device, i is 1, 2, . . . , or N, and N is a positive integer; and determining, by the sending device, the target precoding matrix V from the preset codebook according to the indication message.

With reference to the sixth implementation of the first aspect, in a seventh implementation of the first aspect, the receiving, by the sending device, an indication message that is sent by the receiving device and that is used to instruct to determine the target precoding matrix V from a preset codebook includes:

receiving, by the sending device, the indication message, where the indication message includes information used to indicate a serial number of the target precoding matrix V in the preset codebook; and the determining, by the sending device, the target precoding matrix V from the preset codebook according to the indication message includes:

obtaining, by the sending device, the target precoding matrix V from the preset codebook according to the serial number.

With reference to the sixth or the seventh implementation of the first aspect, in an eighth implementation of the first aspect, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

With reference to any possible implementation of the sixth to the eighth implementations of the first aspect, in a ninth implementation of the first aspect, a rank of each precoding matrix in the N precoding matrices included in the preset codebook is at least 2.

With reference to the first aspect, in a tenth implementation of the first aspect, the determining, by a sending device, a target precoding matrix V includes:

receiving, by the sending device, an indication message that is sent by the receiving device and that is used to indicate the channel matrix H;

receiving, by the sending device, an indication message that is sent by the receiving device and that is used to indicate the equivalent channel matrix $\tilde{H}$; and determining, by the sending device, the target precoding matrix V according to H and $\tilde{H}$.

With reference to any possible implementation of the first aspect or the first to the tenth implementations of the first aspect, in an eleventh implementation of the first aspect, the transmission distance D between the sending device and the receiving device is a distance between a central location of the antenna of the sending device and a central location of the antenna of the receiving device.

According to a second aspect, a signal transmission method is provided, and the method includes:

determining, by a receiving device, a target precoding matrix V, where $V=(H)^{-1}\cdot\tilde{H}$, H indicates a channel matrix between a sending device and the receiving device, $\tilde{H}$ indicates an equivalent channel matrix between the sending device and the receiving device, $\tilde{H}$ meets that $(\tilde{H}^H\cdot\tilde{H})$ or $(\tilde{H}\cdot\tilde{H}^H)$ is a diagonal matrix, and $\tilde{H}$ is related to a transmission distance D between the sending device and the receiving device and an element spacing of an antenna of the receiving device; and sending, by the receiving device to the sending device, an indication message used to indicate the target precoding matrix V, so that the sending device sends a signal to the receiving device according to the target precoding matrix V.

With reference to the second aspect, in a first implementation of the second aspect, the determining, by a receiving device, a target precoding matrix V includes:

determining, by the receiving device, $\tilde{H}$ according to the transmission distance D and the element spacing of the antenna of the receiving device; and determining, by the receiving device, the target precoding matrix V according to $\tilde{H}$ and H.

With reference to the first implementation of the second aspect, in a second implementation of the second aspect, the determining, by the receiving device, $\tilde{H}$ according to the transmission distance D and the element spacing of the antenna of the receiving device includes:

determining, by the receiving device, an equivalent element spacing of an antenna of the sending device according to the transmission distance D and the element spacing of the antenna of the receiving device; and determining, by the receiving device, $\tilde{H}$ according to the equivalent element spacing of the antenna of the sending device, the element spacing of the antenna of the receiving device, and the transmission distance D.

With reference to the second implementation of the second aspect, in a third implementation of the second aspect, the determining, by the receiving device, an equivalent element spacing of an antenna of the sending device according to the transmission distance D and the element spacing of the antenna of the receiving device includes:

determining, by the receiving device, an equivalent element spacing $s_g$ of the antenna of the sending device according to the transmission distance D and the element spacing of the antenna of the receiving device, where $s_g$ meets the following formula:

$$s_g s_2 = \left(p + \frac{1}{\max(N_t, N_r)}\right) \frac{D\lambda}{\sin\theta \sin\omega},$$

where $s_2$ is the element spacing of the antenna of the receiving device, D is the transmission distance D, P is a constant, $\lambda$ is a wavelength, $N_t$ is a quantity of elements included in the antenna of the sending device, $N_r$ is a quantity of elements included in the antenna of the receiving device, $\theta$ indicates an angle between the antenna of the sending device and a projection that is of the antenna of the sending device and that is on a reference plane, and $\omega$ indicates an angle between the antenna of the receiving device and a projection that is of the antenna of the receiving device and that is on the reference plane.

With reference to any one of the first to the third implementations of the second aspect, in a fourth implementation of the second aspect, before the determining, by the receiving device, $\tilde{H}$ according to the transmission distance D and the element spacing of the antenna of the receiving device, the method further includes:

receiving, by the receiving device, an indication message that is sent by the sending device and that is used to indicate the transmission distance D.

With reference to the second aspect, in a fifth implementation of the second aspect, the determining, by a receiving device, a target precoding matrix V includes:

determining, by the receiving device, the target precoding matrix V from N precoding matrices included in a preset codebook, where an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ or is a diagonal matrix, $\tilde{H}_i$ is related to a transmission distance between the transmit end device and the receive end device and an element spacing of an antenna of the receive end device, i is 1, 2, . . . , or N, and N is a positive integer.

With reference to the fifth implementation of the second aspect, in a sixth implementation of the second aspect, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N; and the determining, by the receiving device, the target precoding matrix V from N precoding matrices included in a preset codebook includes:

determining, by the receiving device, a target codebook subset from the M codebook subsets, where an absolute value of a difference between a transmission distance corresponding to the target codebook subset and the transmission distance D between the sending device and the receiving device is less than a preset threshold; and determining, by the receiving device according to the channel matrix H, the target precoding matrix V from one or more precoding matrices included in the target codebook subset.

With reference to the sixth implementation of the second aspect, in a seventh implementation of the second aspect, the determining, by the receiving device, a target codebook subset from the M codebook subsets includes:

determining, by the receiving device, the target codebook subset from the M codebook subsets according to the transmission distance D between the sending device and the receiving device and transmission distances corresponding to different codebook subsets in the M codebook subsets, where the absolute value of the difference between the transmission distance corresponding to the target codebook subset and the transmission distance D is less than the preset threshold; or determining, by the receiving device, the target codebook subset from the M codebook subsets according to an indication message that is sent by the sending device and that is used to indicate the target codebook subset.

With reference to the sixth or the seventh implementation of the second aspect, in an eighth implementation of the second aspect, the determining, by the receiving device according to the channel matrix H, the target precoding matrix V from one or more precoding matrices included in the target codebook subset includes:

determining, by the receiving device according to the channel matrix H and from the one or more precoding matrices included in the target codebook subset, the target precoding matrix V based on at least one criterion in the following preset criteria: a channel capacity maximization criterion, a channel throughput maximization criterion, or a channel chordal distance minimization criterion.

With reference to any possible implementation of the fifth to the eighth implementations of the second aspect, in a ninth implementation of the second aspect, a rank of each precoding matrix in the N precoding matrices in the preset codebook is at least 2.

With reference to the foregoing implementations of the second aspect, in a tenth implementation of the second aspect, the transmission distance D between the sending device and the receiving device is a distance between a central location of the antenna of the sending device and a central location of the antenna of the receiving device.

According to a third aspect, a signal transmission device is provided, and the device includes:

a determining module, configured to determine a target precoding matrix V, where $V=(H)^{-1}\cdot\tilde{H}$, H indicates a channel matrix between the device and a receiving device, $\tilde{H}$ indicates an equivalent channel matrix between the device and the receiving device, $(\tilde{H}^H\cdot\tilde{H})$ or $(\tilde{H}\cdot\tilde{H}^H)$ is a diagonal matrix, and $\tilde{H}$ is related to a transmission distance D between the device and the receiving device and an element spacing of an antenna of the receiving device; and a sending module, configured to send a signal to the receiving device according to the target precoding matrix V determined by the determining unit.

With reference to the third aspect, in a first implementation of the third aspect, the determining module includes:

a first determining unit, configured to determine the equivalent channel matrix $\tilde{H}$ according to the transmission distance D and the element spacing of the antenna of the receiving device; and a second determining unit, configured to determine the target precoding matrix V according to $\tilde{H}$ determined by the first determining unit and H.

With reference to the first implementation of the third aspect, in a second implementation of the third aspect, the first determining unit includes:

a first determining subunit, configured to determine an equivalent element spacing of an antenna of the device according to the transmission distance D and the element spacing of the antenna of the receiving device; and a second determining subunit, configured to determine the equivalent channel matrix $\tilde{H}$ according to the equivalent element spacing that is of the antenna of the device and that is determined by the first determining subunit, the element spacing of the antenna of the receiving device, and the transmission distance D.

With reference to the second implementation of the third aspect, in a third implementation of the third aspect, the first determining subunit is specifically configured to determine an equivalent element spacing $s_g$ of the antenna of the device according to the transmission distance D and the element spacing of the antenna of the receiving device, and $s_g$ meets the following formula:

$$s_g s_2 = \left(p + \frac{1}{\max(N_t, N_r)}\right)\frac{D\lambda}{\sin\theta\sin\omega},$$

where $s_2$ is the element spacing of the antenna of the receiving device, D is the transmission distance D, P is a constant, $\lambda$ is a wavelength, $N_t$ is a quantity of elements included in the antenna of the device, $N_r$ is a quantity of elements included in the antenna of the receiving device, $\theta$ indicates an angle between the antenna of the device and a projection that is of the antenna of the device and that is on a reference plane, and $\omega$ indicates an angle between the antenna of the receiving device and a projection that is of the antenna of the receiving device and that is on the reference plane.

With reference to any possible implementation of the first to the third implementations of the third aspect, in a fourth implementation of the third aspect, the device further includes:

a first receiving module, configured to: before the first determining unit determines the equivalent channel matrix $\tilde{H}$, receive an indication message that is sent by the receiving device and that is used to indicate the transmission distance D.

With reference to any possible implementation of the third aspect or the first to the fourth implementations of the third aspect, in a fifth implementation of the third aspect, the device further includes:

a second receiving module, configured to: before the determining module determines the target precoding matrix V, receive an indication message that is sent by the receiving device and that is used to indicate the channel matrix H.

With reference to the third aspect, in a sixth implementation of the third aspect, the determining module includes:

a first receiving unit, configured to receive an indication message that is sent by the receiving device and that is used to instruct to determine the target precoding matrix V from a preset codebook, where the preset codebook includes N precoding matrices, and an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ or is a diagonal matrix, $\tilde{H}_i$ is related to a transmission distance between the transmit end device and the receive end device and an element spacing of an antenna of the receive end device, i is 1, 2, . . . , or N, and N is a positive integer; and a third determining unit, configured to determine the target precoding matrix V from the preset codebook according to the indication message received by the first receiving unit.

With reference to the sixth implementation of the third aspect, in a seventh implementation of the third aspect, the first receiving unit is specifically configured to receive the indication message, where the indication message includes information used to indicate a serial number of the target precoding matrix V in the preset codebook; and the third determining unit is specifically configured to obtain the target precoding matrix V from the preset codebook according to the serial number received by the first receiving unit.

With reference to the sixth or the seventh implementation of the third aspect, in an eighth implementation of the third aspect, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

With reference to any possible implementation of the sixth to the eighth implementations of the third aspect, in a ninth implementation of the third aspect, a rank of each precoding matrix in the N precoding matrices included in the preset codebook is at least 2.

With reference to the third aspect, in a tenth implementation of the third aspect, the determining module includes:

a second receiving unit, configured to receive an indication message that is sent by the receiving device and that is used to indicate the channel matrix H;

a third receiving unit, configured to receive an indication message that is sent by the receiving device and that is used to indicate the equivalent channel matrix $\tilde{H}$; and a fourth determining unit, configured to determine the target precoding matrix V according to H received by the second receiving unit and $\tilde{H}$ received by the third receiving unit.

With reference to any possible implementation of the third aspect or the first to the tenth implementations of the third aspect, in an eleventh implementation of the third aspect, the transmission distance D between the device and the receiving device is a distance between a central location of the antenna of the device and a central location of the antenna of the receiving device.

According to a fourth aspect, a signal transmission device is provided, including:

a determining module, configured to determine a target precoding matrix V, where $V=(H)^{-1}\cdot\tilde{H}$, H indicates a channel matrix between a sending device and the device, $\tilde{H}$ indicates an equivalent channel matrix between the sending device and the device, $\tilde{H}$ meets that $(\tilde{H}^H\cdot\tilde{H})$ or $(\tilde{H}\cdot\tilde{H}^H)$ is a diagonal matrix, and $\tilde{H}$ is related to a transmission distance D between the sending device and the device and an element spacing of an antenna of the device; and a sending module, configured to send, to the sending device, an indication message used to indicate the target precoding matrix V determined by the determining module, so that the sending device sends a signal to the device according to the target precoding matrix V.

With reference to the fourth aspect, in a first implementation of the fourth aspect, the determining module includes:

a first determining unit, configured to determine $\tilde{H}$ according to the transmission distance D and the element spacing of the antenna of the device; and a second determining unit, configured to determine the target precoding matrix V according to $\tilde{H}$ determined by the first determining unit and H.

With reference to the first implementation of the fourth aspect, in a second implementation of the fourth aspect, the first determining unit includes:

a first determining subunit, configured to determine an equivalent element spacing of an antenna of the sending device according to the transmission distance D and the element spacing of the antenna of the device; and a second determining subunit, configured to determine $\tilde{H}$ according to the equivalent element spacing that is of the antenna of the sending device and that is determined by the first determining subunit, the element spacing of the antenna of the device, and the transmission distance D.

With reference to the second implementation of the fourth aspect, in a third implementation of the fourth aspect, the first determining subunit is specifically configured to determine an equivalent element spacing $s_g$ of the antenna of the sending device according to the transmission distance D and the element spacing of the antenna of the device, and $s_g$ meets the following formula:

$$s_g s_2 = \left(p + \frac{1}{\max(N_t, N_r)}\right)\frac{D\lambda}{\sin\theta\sin\omega},$$

where $s_2$ is the element spacing of the antenna of the device, D is the transmission distance D, P is a constant, $\lambda$ is a wavelength, $N_t$ is a quantity of elements included in the antenna of the sending device, $N_r$ is a quantity of elements included in the antenna of the device, $\theta$ indicates an angle between the antenna of the sending device and a projection that is of the antenna of the sending device and that is on a reference plane, and $\omega$ indicates an angle between the antenna of the device and a projection that is of the antenna of the device and that is on the reference plane.

With reference to any one of the first to the third implementations of the fourth aspect, in a fourth implementation of the fourth aspect, the device further includes:

a receiving module, configured to: before the first determining unit determines $\tilde{H}$, receive an indication message that is sent by the sending device and that is used to indicate the transmission distance D.

With reference to the fourth aspect, in a fifth implementation of the fourth aspect, the determining module is specifically configured to determine the target precoding matrix V from N precoding matrices included in a preset codebook, where an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ is a diagonal matrix, $\tilde{H}_i$ is related to a transmission distance between the transmit end device and the receive end device and an element spacing of an antenna of the receive end device, i is 1, 2, . . . , or N, and N is a positive integer.

With reference to the fifth implementation of the fourth aspect, in a sixth implementation of the fourth aspect, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N; and the determining module includes:

a third determining unit, configured to determine a target codebook subset from the M codebook subsets, where an absolute value of a difference between a transmission distance corresponding to the target codebook subset and the transmission distance D between the sending device and the device is less than a preset threshold; and a fourth determining unit, configured to determine, according to the channel matrix H, the target precoding matrix V from one or more precoding matrices included in the target codebook subset determined by the third determining unit.

With reference to the sixth implementation of the fourth aspect, in a seventh implementation of the fourth aspect, the third determining unit is specifically configured to determine the target codebook subset from the M codebook subsets according to the transmission distance D between the sending device and the device and the device and transmission distances corresponding to different codebook subsets in the M codebook subsets, where the absolute value of the difference between the transmission distance corresponding to the target codebook subset and the transmission distance D is less than the preset threshold; or the third determining unit is specifically configured to determine the target codebook subset from the M codebook subsets according to an indication message that is sent by the sending device and that is used to indicate the target codebook subset.

With reference to the sixth or the seventh implementation of the fourth aspect, in an eighth implementation of the fourth aspect, the fourth determining unit is specifically configured to determine, according to the channel matrix H and from the one or more precoding matrices included in the target codebook subset, the target precoding matrix V based on at least one criterion in the following preset criteria: a channel capacity maximization criterion, a channel throughput maximization criterion, or a channel chordal distance minimization criterion.

With reference to any possible implementation of the fifth to the eighth implementations of the fourth aspect, in a ninth implementation of the fourth aspect, a rank of each precoding matrix in the N precoding matrices in the preset codebook is at least 2.

With reference to the foregoing implementations of the fourth aspect, in a tenth implementation of the fourth aspect, the transmission distance D between the sending device and the device is a distance between a central location of the antenna of the sending device and a central location of the antenna of the device.

Based on the foregoing technical solutions, according to the signal transmission method and device provided in the embodiments of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be considered as being equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission method and device provided in the embodiments of the present invention can support multiple data stream transmission in a direct path condition.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 shows a schematic flowchart of a signal transmission method according to an embodiment of the present invention;

FIG. 2 shows a schematic diagram of a signal transmission method according to an embodiment of the present invention;

FIG. 5 shows another schematic flowchart of a signal transmission method according to an embodiment of the present invention;

FIG. 6 shows still another schematic flowchart of a signal transmission method according to an embodiment of the present invention;

DESCRIPTION OF EMBODIMENTS

Figure 3:
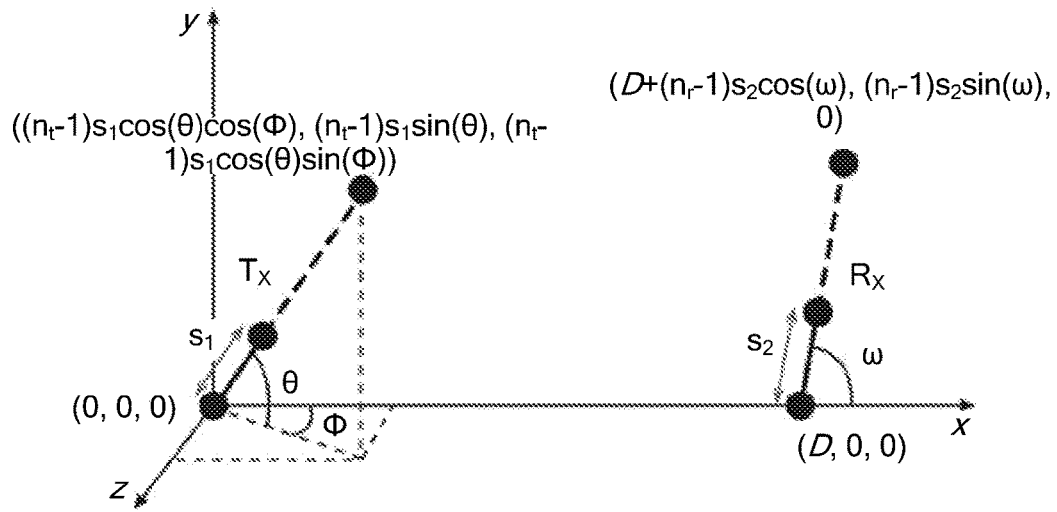
FIG. 3 shows another schematic diagram of a signal transmission method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as: a Global System for Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, and a Universal Mobile Telecommunications System (Universal Mobile Telecommunication System, "UMTS" for short). The embodiments of the present invention are described by using a GSM network and an LTE network as examples, but this imposes no limitation on the embodiments of the present invention.

It should also be understood that in the embodiments of the present invention, a sending device may be a base station or user equipment (User Equipment, "UE" for short), and the sending device may also be referred to as a transmit end device; and a receiving device may be UE or a base station, and the receiving device may also be referred to as a receive end device.

It should also be understood that in the embodiments of the present invention, user equipment (User Equipment, UE for short) may also be referred to as a terminal, a mobile station (Mobile Station, MS for short), a mobile terminal (Mobile Terminal), and the like. The user equipment may communicate with one or more core networks through a radio access network (Radio Access Network, RAN for short). For example, the user equipment may be a mobile phone (also referred to as a "cellular" phone) or a computer with a mobile terminal. For example, the user equipment may be a portable, pocket-sized, handheld, computer built-in, or in-vehicle mobile apparatus, which exchanges voice and/or data with the radio access network. Alternatively, in the embodiments of the present invention, the user equipment UE may be, for example, a mobile relay device such as a mobile access point (AP, Access Point).

In the embodiments of the present invention, a base station may be a base station (Base Transceiver Station, BTS for short) in GSM, or may be a base station (NodeB, NB for short) in WCDMA, or may be an evolved NodeB (Evolutional Node B, ENB or e-NodeB for short) in LTE. This is not limited in the embodiments of the present invention. However, for ease of description, the following embodiments are described by using an ENB as an example.

FIG. 1 shows a schematic flowchart of a signal transmission method 100 according to an embodiment of the present invention. The method is executed by, for example, a sending device, and the method 100 includes the following steps:

S110. The sending device determines a target precoding matrix V, where $V=(H)^{-1} \cdot \tilde{H}$, H indicates a channel matrix between the sending device and a user equipment receiving device, $\tilde{H}$ indicates an equivalent channel matrix between the sending device and the receiving device, $\tilde{H}$ meets that $(\tilde{H}^H \cdot \tilde{H})$ or $(\tilde{H} \cdot \tilde{H}^H)$ is a diagonal matrix, and $\tilde{H}$ is related to a transmission distance D between the sending device and the receiving device and an element spacing of an antenna of the receiving device.

S120. The sending device sends a signal to the receiving device according to the target precoding matrix V.

The equivalent channel matrix $\tilde{H}$ meets a characteristic that $(\tilde{H}^H \cdot \tilde{H})$ or $(\tilde{H} \cdot \tilde{H}^H)$ is a diagonal matrix. It should be noted that in this embodiment of the present invention, ($\tilde{H}^H \cdot \tilde{H}$) or ($\tilde{H} \cdot \tilde{H}^H$) may be an approximate diagonal matrix. For example, a diagonal element of ($\tilde{H}^H \cdot \tilde{H}$) or ($\tilde{H} \cdot \tilde{H}^H$) is 0, and a modulus value of a non-diagonal element thereof is approximately 0. This is not limited in this embodiment of the present invention. It should be understood that because the equivalent channel matrix $\tilde{H}$ meets a characteristic that ($\tilde{H}^H \cdot \tilde{H}$) or ($\tilde{H} \cdot \tilde{H}^H$) is a diagonal matrix or an approximate diagonal matrix, a channel corresponding to $\tilde{H}$ supports multiple data stream transmission.

That $\tilde{H}$ is related to the transmission distance D between the sending device and the receiving device and the element spacing of the antenna of the receiving device specifically means that $\tilde{H}$ may be obtained according to the transmission distance D and the element spacing of the antenna of the receiving device; or means that $\tilde{H}$ is obtained by using another method, but an element spacing of a transmit end of the channel corresponding to $\tilde{H}$ has a mathematical relationship with the transmission distance D and the element spacing of the antenna of the receiving device.

It should be understood that a MIMO wireless system may obtain diversity and multiplexing gains by means of transmit beamforming (Beam Forming, "BF" for short)/precoding and receive signal combination. A conventional and typical system using the BF or the precoding may be generally expressed as:

$$y = HVs + n \quad (1)$$

y indicates a received signal vector, H indicates a channel matrix, V indicates a precoding matrix, s indicates a transmitted symbol vector, and n is measurement noise. It should be understood that the channel matrix H in this embodiment of the present invention is the same as H in formula (1).

In this embodiment of the present invention, the signal is sent to the receiving device according to the target precoding matrix V that meets $V = (H)^{-1} \cdot \tilde{H}$, and $V = (H)^{-1} \cdot \tilde{H}$ may be substituted into formula (1) to obtain:

$$y = HVs + n = H \cdot (H)^{-1} \cdot \tilde{H}s + n = \tilde{H}s + n \quad (2)$$

It can be learned that sending the signal to the receiving device according to the target precoding matrix V is equivalent to transmitting the signal based on the equivalent channel matrix $\tilde{H}$. Because the equivalent channel matrix $\tilde{H}$ meets the characteristic that ($\tilde{H}^H \cdot \tilde{H}$) or ($\tilde{H} \cdot \tilde{H}^H$) is a diagonal matrix or an approximate diagonal matrix, the channel corresponding to $\tilde{H}$ supports multiple data stream transmission. Therefore, multiple data stream transmission between the sending device and the receiving device can be supported when the signal is sent to the receiving device according to the target precoding matrix V.

Therefore, in this embodiment of the present invention, a target precoding matrix V is determined, where $V = (H)^{-1} \cdot \tilde{H}$, H indicates a channel matrix between a sending device and a receiving device, $\tilde{H}$ indicates an equivalent channel matrix between the sending device and the receiving device, ($\tilde{H}^H \cdot \tilde{H}$) or ($\tilde{H} \cdot \tilde{H}^H$) is a diagonal matrix, and $\tilde{H}$ is related to a transmission distance between the sending device and the receiving device and an element spacing of an antenna of the receiving device. It should be understood that because $\tilde{H}$ meets a characteristic that ($\tilde{H}^H \cdot \tilde{H}$) or ($\tilde{H} \cdot \tilde{H}^H$) is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported.

Therefore, the signal transmission method provided in this embodiment of the present invention can support multiple data stream transmission.

Specifically, in S110, the sending device may obtain the target precoding matrix V by means of calculation according to the equivalent channel matrix $\tilde{H}$ and the channel matrix H, or may determine the target precoding matrix V by receiving an indication message used to indicate the target precoding matrix V. Details are described below.

Optionally, in this embodiment of the present invention, S110 in which the sending device determines the target precoding matrix V includes the following steps:

S111. The sending device determines the equivalent channel matrix $\tilde{H}$ according to the transmission distance D between the sending device and the receiving device and the element spacing of the antenna of the receiving device.

S112. The sending device determines the target precoding matrix V according to the equivalent channel matrix $\tilde{H}$ and $\tilde{H}$.

The transmission distance D between the sending device and the receiving device is a signal transmission distance between the sending device and the receiving device.

Optionally, in this embodiment of the present invention, the transmission distance D between the sending device and the receiving device is a distance between a central location of the antenna of the sending device and a central location of the antenna of the receiving device.

Specifically, a central location of an antenna Tx of the sending device is a central location in a physical structure of the antenna Tx, for example, may be a center of antenna elements of the antenna Tx. For example, the antenna Tx includes five elements arranged in a straight line, and a location of the third element in the middle may be considered as the central location of the antenna Tx. A central location of an antenna P2 of the receiving device is also a central location in a physical structure of the antenna Rx.

The following uses a MIMO mobile communication scenario shown in FIG. 2 as an example for description. As shown in FIG. 2, no obstacle exists between a sending device and a receiving device, that is, a signal propagation path between the sending device and the receiving device is a direct propagation path without an obstacle. That is, a direct path exists between the sending device and the receiving device. Herein, description is provided by using an example in which an antenna Tx of the sending device (for example, a base station) includes two elements T1 and T2 and an antenna Rx of the receiving device (for example, UE) includes two elements R1 and R2. However, the solution in the present invention is not limited to this antenna configuration. A central location of the antenna Tx of the sending device is a central location P1A between the elements T1 and T2. The elements T1 and T2 are evenly distributed on two sides of the central location P1A. For example, distances from T1 and T2 each to the central location P1A are s1/2. A central location of the antenna Rx of the receiving device is a central location P2A between the elements R1 and R2. The elements R1 and R2 are evenly distributed on two sides of the central location P2A of the receive end antenna Rx. For example, distances from R1 and R2 each to the central location P2A are s1/2. A transmission distance D between the sending device and the receiving device may be a distance between the central location P1A and the central location P2A.

The element spacing of the antenna of the receiving device is, for example, a distance s2 between the two elements R1 and R2 of the antenna Rx of the receiving device shown in FIG. 2.

It should be understood that FIG. 2 is merely a schematic diagram of a typical application scenario of an embodiment of the present invention, and constitutes no limitation.

It should also be understood that the sending device may measure the transmission distance D between the sending device and the receiving device, or may determine the transmission distance D by receiving an indication message that is sent by the receiving device and that is used to indicate the transmission distance D. This is not limited in this embodiment of the present invention.

Optionally, in this embodiment of the present invention, before S111 in which the sending device determines the equivalent channel matrix $\tilde{H}$ according to the transmission distance D between the sending device and the receiving device and the element spacing of the antenna of the receiving device, the method 100 further includes the following step:

S113. The sending device receives an indication message that is sent by the receiving device and that is used to indicate the transmission distance D.

Specifically, the receiving device measures the transmission distance D, and then sends, to the sending device, the indication message used to indicate the transmission distance D, so as to notify the sending device; and the sending device obtains the transmission distance D according to the indication message.

In S111, the sending device determines $\tilde{H}$ according to the transmission distance D and the element spacing of the antenna of the receiving device. Specifically, the equivalent channel matrix $\tilde{H}$ may be obtained by means of calculation according to the transmission distance D and the element spacing of the antenna of the receiving device; or the equivalent channel matrix $\tilde{H}$ may be determined based on preset information and according to the transmission distance D and the element spacing of the antenna of the receiving device. For example, correspondences between the transmission distance D and the element spacing of the antenna of the receiving device each and the equivalent channel matrix $\tilde{H}$ are recorded in the preset information. The preset information may be preset system information. This is not limited in the present invention.

Optionally, in this embodiment of the present invention, S111 in which the sending device determines the equivalent channel matrix $\tilde{H}$ according to the transmission distance D and the element spacing of the antenna of the receiving device includes the following steps:

S111A. The sending device determines an equivalent element spacing of an antenna of the sending device according to the transmission distance D and the element spacing of the antenna of the receiving device.

S111B. The sending device determines the equivalent channel matrix $\tilde{H}$ according to the equivalent element spacing sg, the element spacing s2 of the antenna of the receiving device, and the transmission distance D.

Specifically, the MIMO communications system shown in FIG. 2 is still used as an example. The transmission distance D between the sending device and the receiving device is the distance D between the central locations P1A and P2A, and an element spacing of the antenna Rx of the receiving device is the distance s2 between the elements R1 and R2. An equivalent element spacing (a distance sg between elements T1' and T2' shown in FIG. 2) of the antenna Tx of the sending device is determined according to the transmission distance D and the element spacing s2.

More specifically, the equivalent element spacing sg of the antenna Tx of the sending device is estimated according to the transmission distance D, the element spacing s2 of the antenna Rx of the receiving device, an azimuth of the antenna Tx of the sending device, and an azimuth of the antenna Rx of the receiving device. The azimuth of the antenna Tx of the sending device may be an angle between the antenna Tx of the sending device and a projection that is of the antenna Tx and that is on a reference plane, or may be an angle between the antenna Tx of the sending device and the antenna Rx of the receiving device. The azimuth of the antenna of the sending device may be defined by using different methods corresponding to different calculation methods, and this is not limited in this embodiment of the present invention. Similarly, a definition of the azimuth of the antenna of the receiving device is not limited either.

Optionally, in this embodiment of the present invention, S111A in which the sending device determines the equivalent element spacing of the antenna of the sending device according to the transmission distance D and the element spacing of the antenna of the receiving device includes:

The sending device determines an equivalent element spacing $s_g$ of the antenna of the sending device according to the transmission distance D and the element spacing of the antenna of the receiving device, where $s_g$ meets the following formula:

$$s_g s_2 = \left( p + \frac{1}{\max(N_t, N_r)} \right) \frac{D\lambda}{\sin\theta \sin\omega} \quad (3)$$

$s_2$ is the element spacing of the antenna of the receiving device, D is the transmission distance D, P is a constant, $\lambda$ is a wavelength, $N_t$ is a quantity of elements included in the antenna of the sending device, $N_r$ is a quantity of elements included in the antenna of the receiving device, $\theta$ indicates an angle between the antenna of the sending device and a projection that is of the antenna of the sending device and that is on a reference plane, and $\omega$ indicates an angle between the antenna of the receiving device and a projection that is of the antenna of the receiving device and that is on the reference plane.

Specifically, the equivalent element spacing $s_g$ may be calculated according to the foregoing formula (3); or the equivalent element spacing $s_g$ may be determined according to another existing related calculation means, so that the equivalent element spacing $s_g$ meets formula (3).

Specifically, as shown in FIG. 3, Tx is a transmit end antenna, Rx is a receive end antenna, sg is an element spacing of the transmit end antenna Tx, and s2 is an element spacing of the receive end antenna Rx. A distance between the transmit end antenna Tx and the receive end antenna Rx in an X-axis direction in a coordinate system XYZ is used as a transmission distance D between a sending device and a receiving device in this embodiment of the present invention. Azimuths of the transmit end antenna Tx are marked as $\theta$ and $\varphi$, where $\theta$ indicates an angle between the antenna of the sending device and a projection that is of the antenna of the sending device and that is on a reference plane, and $\varphi$ indicates an angle between an X-axis and the projection that is of the antenna of the sending device and that is on the reference plane. The reference plane is an XZ plane shown in FIG. 3. An azimuth of the receive end antenna Rx is marked as $\omega$, where $\omega$ indicates an angle between the antenna of the receiving device and a projection that is of the antenna of the receiving device and that is on the reference plane. An effect of the angle $\varphi$ is approximately ignored in this formula.

It should be understood that the equivalent element spacing sg (the distance between the physical elements T1' and T2' of the antenna Tx shown in FIG. 2) that is of the antenna of the sending device and that is obtained by means of calculation based on formula (3) is greater than a physical element spacing (a distance s1 between the physical elements T1 and T2 of the antenna Tx shown in FIG. 2) of the antenna Tx of the sending device. Compared with channel relevancy when a signal is sent from the elements T1 and T2 to the elements R1 and R2 of the antenna Rx, channel relevancy when a signal is sent from the elements T1' and T2' that have the equivalent element spacing sg to the elements R1 and R2 of the antenna Rx is lower, so that multiple data stream transmission can be supported.

Formula (3) is merely a specific calculation method for determining the element spacing sg of the antenna of the sending device according to the transmission distance D between the sending device and the receiving device and the element spacing s1 of the antenna of the receiving device. It should be understood that the element spacing sg may be determined by using another method for estimating an antenna element spacing in the prior art, and this is not limited in this embodiment of the present invention. It should be understood that when the element spacing sg is estimated by using different calculation methods, different antenna angle information is correspondingly used, and is not limited to the angles θ and ω defined in formula (3).

It should be understood that an equivalent element spacing $s_g$ that does not meet formula (3) may be obtained based on another algorithm. However, it can be ensured that multiple data stream transmission can be supported when a transmit antenna whose elements are arranged according to the equivalent element spacing $s_g$ sends a signal to a receive antenna.

In S111B, the sending device determines the equivalent channel matrix H̃ according to the equivalent element spacing sg, the element spacing s2 of the antenna of the receiving device, and the transmission distance D.

Specifically, the MIMO communications system shown in FIG. 2 is still used as an example. For example, measured distances from the equivalent element T1' to R1 and R2 each are respectively $\tilde{d}_{11}$ and $\tilde{d}_{21}$, and measured distances from the equivalent element T2' to R1 and R2 each are respectively $\tilde{d}_{12}$ and $\tilde{d}_{22}$. In this case, the equivalent channel matrix H̃ may be expressed as:

$$\tilde{H} = \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix},$$

where $$k = \frac{2\pi}{\lambda},$$

and λ is a constant.

It should be understood that a channel capacity of the MIMO communications system is directly proportional to a minimum antenna quantity of the transmit end and the receive end. Therefore, in this embodiment of the present invention, a quantity of equivalent elements of the antenna of the sending device is determined according to a minimum antenna quantity of the sending device and the receiving device, that is, a dimension quantity of the equivalent channel matrix H̃ is determined according to the minimum antenna quantity of the sending device and the receiving device. For example, in the MIMO communications system shown in FIG. 2, the minimum antenna quantity of the sending device and the receiving device is 2, and therefore, the equivalent channel matrix H̃ is a 2×2 square matrix. In a MIMO communications system shown in FIG. 4, a minimum antenna quantity of a sending device and a receiving device is 2, and therefore, an equivalent channel matrix H̃ is also a 2×2 square matrix.

It can be learned from the foregoing that in this embodiment of the present invention, the equivalent channel matrix H̃ may be determined according to the following steps: (1) Determine the equivalent element spacing of the antenna of the sending device. (2) Determine the quantity of equivalent elements of the antenna of the sending device according to the quantity of elements included in the antenna of the receiving device. (3) Calculate, according to the quantity of equivalent elements of the antenna of the sending device and the equivalent element spacing, a distance between each equivalent element of the antenna of the sending device and each element included in the antenna of the receiving device. (4) Calculate the equivalent channel matrix H̃ according to the distance determined in (3).

The foregoing describes the solution of determining the equivalent element spacing sg of the antenna of the sending device so as to determine the equivalent channel matrix H̃. In this embodiment of the present invention, optionally, the equivalent channel matrix H̃ may be determined according to the correspondences between the transmission distance D between the sending device and the receiving device and the element spacing of the antenna of the receiving device each and the equivalent channel matrix H̃. For example, the correspondences may be preset in a system. Therefore, in this solution, the equivalent element spacing of the antenna of the sending device does not need to be calculated.

In S112, the target precoding matrix V is calculated based on a formula $V=(H)^{-1} \cdot \tilde{H}$ and according to the equivalent channel matrix H̃ determined in S111 and H̃.

It should be understood that the channel matrix H between the sending device and the receiving device is used to indicate one type of channel state information in the MIMO system. Specifically, the MIMO communications system shown in FIG. 2 is still used as an example, and the channel matrix H between the sending device and the receiving device may be expressed as:

$$H = \begin{bmatrix} e^{-jkd_{11}} & e^{-jkd_{12}} \\ e^{-jkd_{21}} & e^{-jkd_{22}} \end{bmatrix},$$

where
$d_{ij}$ indicates a distance between a $j^{th}$ element of the sending device and an $i^{th}$ element of the receiving device, $$k = \frac{2\pi}{\lambda},$$

and λ is a constant.

Generally, the sending device obtains the channel matrix H by using feedback information of the receiving device, and description is provided below.

It is assumed that the equivalent channel matrix H̃ obtained in S111 may be expressed as:

$$\tilde{H} = \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix},$$

where a definition of $\tilde{d}_{ij}$ is the same as the foregoing explanation in S111.

The target precoding matrix V is determined according to the following formula:

$$V = (H)^{-1} \cdot \tilde{H} = \begin{bmatrix} e^{-jkd_{11}} & e^{-jkd_{12}} \\ e^{-jkd_{21}} & e^{-jkd_{22}} \end{bmatrix}^{-1} \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix} \quad (4)$$

In S120, the signal is sent to the receiving device according to the target precoding matrix V obtained by means of calculation by using formula (4), so that multiple data stream transmission can be implemented.

For ease of understanding, the MIMO communications system shown in FIG. 2 is used as an example again for description. In a practical operation, a signal is separately sent to the elements R1 and R2 of the antenna Rx of the receiving device by using the physical elements T1 and T2 of the antenna Tx of the sending device. Because the sending device sends the signal to the receiving device according to a target precoding matrix V, V=(H)$^{-1}\cdot\tilde{H}$, and $\tilde{H}$ is an equivalent channel matrix determined according to S111, it may be considered that the sending device separately sends the signal to the elements R1 and R2 of the antenna Rx of the receiving device equivalently based on the equivalent elements T1' and T2'. Therefore, a channel between the signal transmit end and the signal receive end is essentially a channel corresponding to the equivalent channel matrix $\tilde{H}$. That is, in this embodiment of the present invention, in a process in which the sending device sends the signal to the receiving device, the signal is sent by using the physical elements (T1 and T2), but this is equivalent to that the signal is sent by using the equivalent elements (T1' and T2'). A channel corresponding to the signal from the transmit end to the receive end is the channel corresponding to the equivalent channel matrix $\tilde{H}$ instead of a channel corresponding to a channel matrix H. This is why $\tilde{H}$ is referred to as the equivalent channel matrix, T1' and T2' in FIG. 2 are referred to as the equivalent elements, and a spacing between T1' and T2' is referred to as the equivalent element spacing in this embodiment of the present invention.

Therefore, in this embodiment of the present invention, a target precoding matrix V is determined, where V=(H)$^{-1}\cdot\tilde{H}$, H indicates a channel matrix between a sending device and a user equipment receiving device, $\tilde{H}$ indicates an equivalent channel matrix between the sending device and the receiving device, $\tilde{H}$ meets that ($\tilde{H}^H\cdot\tilde{H}$) or ($\tilde{H}\cdot\tilde{H}^H$) is a diagonal matrix or an approximate diagonal matrix, and $\tilde{H}$ is related to a transmission distance between the sending device and the receiving device and an element spacing of an antenna of the receiving device. Then, a signal is sent to the receiving device based on the target precoding matrix V, so that multiple data stream transmission can be implemented. Compared with a prior-art solution in which multiple data stream transmission is implemented by increasing a spacing between transmit end antennas, in this embodiment of the present invention, multiple data stream transmission can be implemented in a direct path condition without modifying original antenna architectures of the sending device and the receiving device. Therefore, an implementation cost can be reduced, and solution applicability is improved.

In this embodiment of the present invention, it may be understood that the equivalent channel matrix $\tilde{H}$ is determined according to the transmission distance D between the sending device and the receiving device, and therefore, it may be considered that the target precoding matrix V is also determined based on the transmission distance D between the sending device and the receiving device. Therefore, even for a mobile user, that is, in a situation in which a signal receive end is in a mobile state, multiple data stream transmission can also be implemented according to the method provided in this embodiment of the present invention, and an original antenna does not need to be adjusted, so that applicability of the method provided in this embodiment of the present invention is significantly improved.

It can be learned from the foregoing that for mobile user equipment, in this embodiment of the present invention, a proper target precoding matrix V may be correspondingly determined according to a change of a transmission distance between a sending device and a receiving device (for example, user equipment), so as to send a signal to the user equipment receiving device according to the target precoding matrix V, so that multiple data stream transmission of a mobile user can be implemented in a direct path condition without a physical modification of an antenna configuration of the sending device. Therefore, a cost is reduced, and flexibility and applicability of multiple data stream transmission implementation are improved.

With reference to the communications system shown in FIG. 2, the foregoing uses an example to describe a process in which the target precoding matrix V is determined based on V=(H)$^{-1}\cdot\tilde{H}$ and by determining the equivalent channel matrix $\tilde{H}$. It should be understood that the foregoing description with reference to FIG. 2 is merely an example instead of a limitation.

It should be noted that in S112, the sending device determines the target precoding matrix V based on V=(H)$^{-1}\cdot\tilde{H}$ and according to the equivalent channel matrix $\tilde{H}$ and $\tilde{H}$, and the channel matrix H may not be a square matrix. In this case, (H)$^{-1}$ refers to obtaining a pseudo-inverse matrix for the channel matrix H, that is, H$^H\cdot$(H$\cdot$H$^H$)$^{-1}$ or (H$^H\cdot$H)$^{-1}\cdot$H$^H$.

Figure 4:
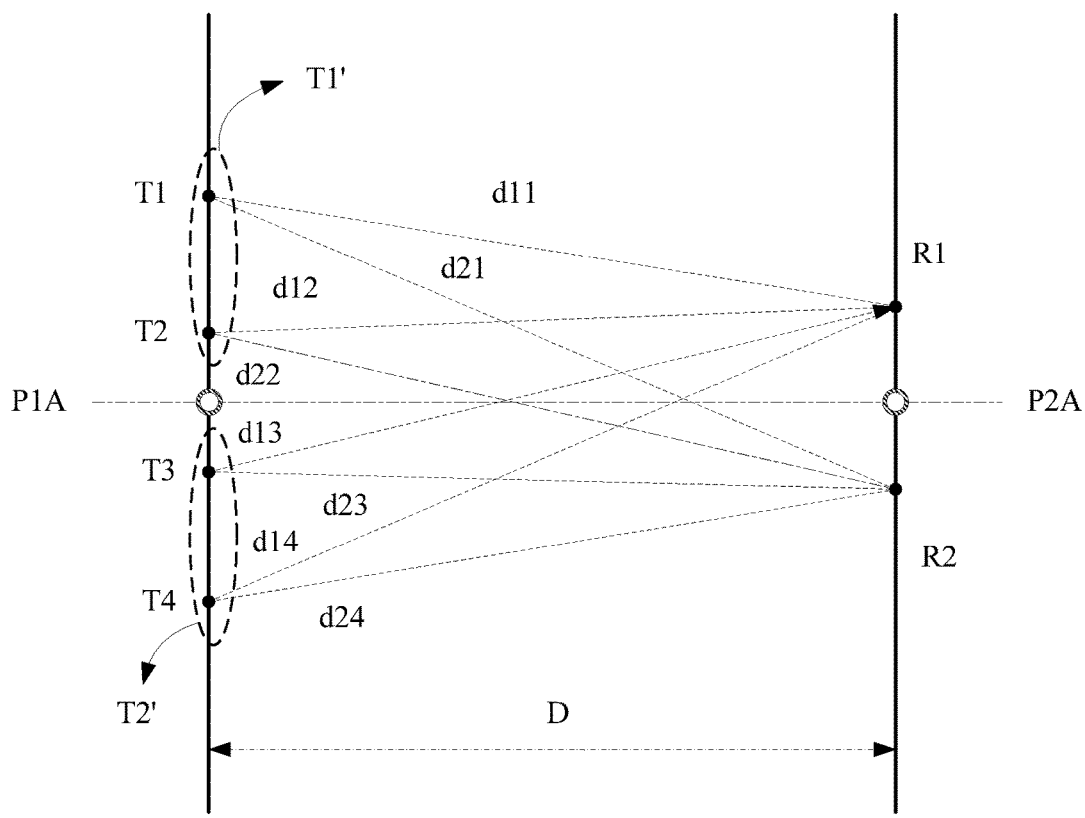
FIG. 4 shows still another schematic diagram of a signal transmission method according to an embodiment of the present invention.

Specifically, in a mobile communications system in a scenario shown in FIG. 4, it is assumed that an antenna Tx of a sending device includes four elements {T1, T2, T3, and T4}, an antenna Rx of a receiving device includes two elements {R1 and R2}, and a transmission distance between the sending device and the receiving device in the system is D (for example, a distance between a central location P1A of the antenna Tx and a central location P2A of the antenna Rx).

In the foregoing system, a channel matrix H between the sending device and the receiving device is a 2×4 matrix, for example, may be expressed as:

$$H = \begin{bmatrix} e^{-jkd_{11}} & e^{-jkd_{12}} & e^{-jkd_{13}} & e^{-jkd_{14}} \\ e^{-jkd_{21}} & e^{-jkd_{22}} & e^{-jkd_{23}} & e^{-jkd_{24}} \end{bmatrix},$$

where $d_{ij}$ indicates a distance between a j$^{th}$ antenna element of the antenna of the sending device and an i$^{th}$ antenna element of the receive end, $$k = \frac{2\pi}{\lambda},$$

and λ is a constant.

It is assumed that all parameters in the scenario shown in FIG. 4 are the same as those in the scenario shown in FIG. 2 except for the antenna of the sending device. An equivalent element spacing sg of the antenna of the sending device may be determined according to the transmission distance D between the sending device and the receiving device and an element spacing s2 of the antenna of the receiving device (for example, a spacing between equivalent elements T1' and T2' of the antenna of the sending device in FIG. 4 is determined by using the method shown in FIG. 3). Then, according to the equivalent element spacing sg, an equivalent channel matrix $\tilde{H}$ is determined according to the foregoing step S111:

$$\tilde{H} = \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix}.$$

Therefore, the target precoding matrix V is determined in S112 according to the following formula:

$$V = H^H \cdot (H \cdot H^H)^{-1} \cdot \tilde{H} \quad (5)$$

$$\text{or } V = (H^H \cdot H)^{-1} H^H \cdot \tilde{H} \quad (6)$$

It should be understood that in this embodiment of the present invention, the equivalent elements (that is, T1' and T2' in FIG. 2 or FIG. 4) of the antenna of the sending device are practically nonexistent and are only a concept introduced for describing the equivalent channel matrix $\tilde{H}$. Correspondingly, the equivalent element spacing of the antenna of the sending device is also an intermediate variable introduced for determining the equivalent channel matrix $\tilde{H}$.

Optionally, in this embodiment of the present invention, before S120 in which the sending device determines the target precoding matrix, the method 100 further includes the following step:

S130. The sending device receives an indication message that is sent by the receiving device and that is used to indicate the channel matrix H.

Specifically, description is provided below by using an example in which the sending device is a base station and the receiving device is user equipment UE.

(1) The UE Receives a Reference Signal Sent by the Base Station.

The reference signal may be at least one of the following signals: a channel state information reference signal (channel state information Reference Signal, CSI RS), a demodulation reference signal (demodulation RS, DM RS), or a cell-specific reference signal (cell-specific RS, CRS).

Optionally, the user equipment UE may learn, by receiving an eNB notification, specifically, for example, radio resource control (Radio Resource Control, RRC) signaling or downlink control information DCI or based on a cell identifier ID, a resource configuration of the reference signal sent by the base station, and receive the reference signal on a time-frequency resource indicated by the resource configuration.

(2) The UE determines a channel matrix H between the base station and the UE by measuring the reference signal.

(3) The UE sends, to the base station, an indication message used to indicate the channel matrix H.

Specifically, for example, the UE notifies the base station of a quantized channel matrix A obtained after the channel matrix H is quantized, and correspondingly, the base station regards the quantized channel matrix A as the channel matrix H and performs subsequent calculation on an equivalent channel matrix $\tilde{H}$ and a target precoding matrix V based on the quantized channel matrix A. It should be understood that after receiving the quantized channel matrix A, the base station calculates the target precoding matrix V based on a formula $V=(A)^{-1} \cdot \tilde{H}$, and then sends a signal to the UE based on formula (2) (y=HVs+n) and according to the target precoding matrix $V=(A)^{-1} \cdot \tilde{H}$. It should be understood that in this case, formula (2) should also be modified to y=AVs+n. It can be learned that the signal can still be transmitted by using a channel corresponding to the equivalent channel matrix $\tilde{H}$.

Optionally, it is assumed that the base station and the UE share a known codebook set U (which may also be referred to as a matrix set U). The UE selects, from the codebook set U according to a specific channel status determined in (2), a matrix providing optimal system performance as a channel matrix of the system, and then feeds back a serial number of the matrix in the codebook set U to the base station. The base station determines the channel matrix H between the base station and the UE according to the serial number.

Optionally, in a process in which the UE selects the matrix providing optimal system performance from the codebook set U according to the specific channel status, for example, the matrix providing optimal system performance is selected by using a preset criterion such as a channel capacity maximization criterion, a channel throughput maximization criterion, or a channel chordal distance minimization criterion.

The foregoing process is the prior art, and specific technical details are not described.

Therefore, in this embodiment of the present invention, a target precoding matrix V is determined, where $V=(H)^{-1} \cdot \tilde{H}$, H indicates a channel matrix between a sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H \cdot \tilde{H})$ or $(\tilde{H} \cdot \tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission method provided in this embodiment of the present invention can support multiple data stream transmission.

It should be understood that FIG. 2 and FIG. 4 are merely examples instead of limitations. In the mobile system shown in FIG. 2, the transmit end antenna and the receive end antenna include elements of a same quantity. However, this embodiment of the present invention is not limited to an antenna configuration. For example, in a mobile communications system, when a transmit end antenna (for example, an antenna of a sending device) has four elements and a receive end antenna (for example, an antenna of a receiving device) has two elements (as shown in FIG. 4), a target precoding matrix $V=(H)^{-1} \cdot \tilde{H}$ may be determined according to the method provided in this embodiment of the present invention. Then, a transmit end sends a signal to a receive end based on the target precoding matrix V, so that multiple data stream transmission can be implemented.

Optionally, in this embodiment of the present invention, S110 in which the sending device determines the target precoding matrix V includes the following steps:

S113. The sending device receives an indication message that is sent by the receiving device and that is used to instruct to determine the target precoding matrix V from a preset codebook, where the preset codebook includes N precoding matrices, and an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ is a diagonal matrix, $\tilde{H}_i$ is related to a transmission distance between the transmit end device and the receive end device and an element spacing of an antenna of the receive end device, i is 1, 2, . . . , or N, and N is a positive integer.

S114. The sending device determines the target precoding matrix V from the preset codebook according to the indication message.

Specifically, the preset codebook is preset in the system, that is, the sending device and the receiving device share the preset codebook. Each precoding matrix in the preset codebook is related to the transmission distance between the transmit end device and the receive end device.

Specifically, it is assumed that the target precoding matrix V determined from the preset codebook is $V=(H)^{-1}\cdot\tilde{H}_x$. An element spacing of a receive end device of a channel corresponding to $\tilde{H}_x$ has a mathematical relationship with the transmission distance D between the sending device and the receiving device and the element spacing of the antenna of the receiving device. Specifically, the relationship is that shown in formula (3).

Specifically, after determining the target precoding matrix V, the receiving device sends the indication message to the sending device, where the indication message is used to enable the sending device to obtain the target precoding matrix V from the preset codebook. For example, the indication message includes a serial number of the target precoding matrix V in the preset codebook.

Optionally, in this embodiment of the present invention, S113 in which the sending device receives the indication message that is sent by the receiving device and that is used to instruct to determine the target precoding matrix V from the preset codebook includes the following step:

S113A. The sending device receives the indication message, where the indication message includes information used to indicate a serial number of the target precoding matrix V in the preset codebook.

S114 in which the sending device determines the target precoding matrix V from the preset codebook according to the indication message includes the following step:

S114A. The sending device obtains the target precoding matrix V from the preset codebook according to the serial number.

Optionally, in this embodiment of the present invention, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

Specifically, a preset codebook R is divided into multiple codebook subsets $C_i$ according to different transmission distances. For example, when a transmission distance is 40 meters, a codebook subset is C1; and when a transmission distance is 50 meters, a codebook subset is C2. Each codebook subset $R_i$ includes one or more precoding matrices, which may also be referred to as codewords.

Optionally, each precoding matrix in the preset codebook in this embodiment of the present invention may be determined according to the method described above in S111 and S112, or may be determined by using another method. This is not limited in this embodiment of the present invention, as long as each precoding matrix $V_i$ included in the preset codebook meets the following characteristic: $V_i=(H_i)^{-1}\cdot\tilde{H}_i$, where $H_i$ indicates the channel matrix between the transmit end device and the receive end device, $\tilde{H}_i$ indicates the equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ is a diagonal matrix, $\tilde{H}_i$ is related to the transmission distance between the transmit end device and the receive end device and the element spacing of the antenna of the receive end device.

Optionally, in this embodiment of the present invention, a rank of each precoding matrix in the N precoding matrices included in the preset codebook is at least 2.

Optionally, in this embodiment of the present invention, S110 in which the sending device determines the target precoding matrix V includes the following steps:

S115. The sending device receives an indication message that is sent by the receiving device and that is used to indicate the channel matrix H, and the sending device determines the channel matrix H according to the indication message.

S116. The sending device receives an indication message that is sent by the receiving device and that is used to indicate the equivalent channel matrix $\tilde{H}$, and the sending device determines the equivalent channel matrix $\tilde{H}$ according to the indication message.

S117. The sending device determines the target precoding matrix V according to H and $\tilde{H}$.

Specifically, the receiving device obtains the equivalent channel matrix $\tilde{H}$, and the receiving device notifies the sending device of the channel matrix H and the equivalent channel matrix $\tilde{H}$. The sending device determines the target precoding matrix V according to the formula $V=(H)^{-1}\cdot\tilde{H}$. When the channel matrix H is not a square matrix, $(H)^{-1}$ refers to obtaining a pseudo-inverse matrix for H, that is, $H^H\cdot(H\cdot H^H)^{-1}$ or $H^H\cdot(H\cdot H^H)^{-1}$.

Optionally, in this embodiment of the present invention, the sending device is a base station.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes the signal transmission method according to the embodiment of the present invention from a perspective of a sending device with reference to FIG. 1 to FIG. 5, and the following describes a signal transmission method according to an embodiment of the present invention from a perspective of a receiving device.

FIG. 5 shows a schematic flowchart of a signal transmission method 200 according to an embodiment of the present invention. The method is executed by, for example, a receiving device, and the method 200 includes the following steps:

S210. The receiving device determines a target precoding matrix V, where $V=(H)^{-1} \cdot \tilde{H}$, H indicates a channel matrix between a sending device and the receiving device, $\tilde{H}$ indicates an equivalent channel matrix between the sending device and the receiving device, $\tilde{H}$ meets that $(\tilde{H}^H \cdot \tilde{H})$ or $(\tilde{H} \cdot \tilde{H}^H)$ is a diagonal matrix, and $\tilde{H}$ is related to a transmission distance D between the sending device and the receiving device and an element spacing of an antenna of the receiving device.

S220. The receiving device sends, to the sending device, an indication message used to indicate the target precoding matrix V, so that the sending device sends a signal to the receiving device according to the target precoding matrix V.

The equivalent channel matrix $\tilde{H}$ meets a characteristic that $(\tilde{H}^H \cdot \tilde{H})$ or $(\tilde{H} \cdot \tilde{H}^H)$ is a diagonal matrix. It should be noted that in this embodiment of the present invention, $(\tilde{H}^H \cdot \tilde{H})$ or $(\tilde{H} \cdot \tilde{H}^H)$ may be an approximate diagonal matrix. For example, a diagonal element of $(\tilde{H}^H \cdot \tilde{H})$ or $(\tilde{H} \cdot \tilde{H}^H)$ is 0, and a modulus value of a non-diagonal element thereof is approximately 0. This is not limited in this embodiment of the present invention. It should be understood that because the equivalent channel matrix $\tilde{H}$ meets a characteristic that $(\tilde{H}^H \cdot \tilde{H})$ or $(\tilde{H} \cdot \tilde{H}^H)$ is a diagonal matrix or an approximate diagonal matrix, a channel corresponding to $\tilde{H}$ supports multiple data stream transmission.

That $\tilde{H}$ is related to the transmission distance D between the sending device and the receiving device and the element spacing of the antenna of the receiving device specifically means that $\tilde{H}$ may be obtained according to the transmission distance D and the element spacing of the antenna of the receiving device; or means that $\tilde{H}$ is obtained by using another method, but an element spacing of a transmit end of the channel corresponding to $\tilde{H}$ has a mathematical relationship with the transmission distance D and the element spacing of the antenna of the receiving device.

It should be understood that a MIMO wireless system may obtain diversity and multiplexing gains by means of transmit beamforming (Beam Forming, "BF" for short)/precoding and receive signal combination. A conventional and typical system using the BF or the precoding may be generally expressed as:

$$y=HVs+n \quad (1)$$

y indicates a received signal vector, H indicates a channel matrix, V indicates a precoding matrix, s indicates a transmitted symbol vector, and n is measurement noise. It should be understood that the channel matrix H in this embodiment of the present invention is the same as H in formula (1).

In this embodiment of the present invention, the signal is sent to the receiving device according to the target precoding matrix V that meets $V=(H)^{-1} \cdot \tilde{H}$, and $V=(H)^{-1} \cdot \tilde{H}$ may be substituted into formula (1) to obtain:

$$y=HVs+n=H \cdot (H)^{-1} \cdot \tilde{H}s+n=\tilde{H}s+n \quad (2)$$

It can be learned that sending the signal to the receiving device according to the target precoding matrix V is equivalent to transmitting the signal based on the equivalent channel matrix $\tilde{H}$. Because the equivalent channel matrix $\tilde{H}$ meets the characteristic that $(\tilde{H}^H \cdot \tilde{H})$ or $(\tilde{H} \cdot \tilde{H}^H)$ is a diagonal matrix or an approximate diagonal matrix, the channel corresponding to $\tilde{H}$ supports multiple data stream transmission. Therefore, multiple data stream transmission between the sending device and the receiving device can be supported when the signal is sent to the receiving device according to the target precoding matrix V.

Therefore, in this embodiment of the present invention, a target precoding matrix V is determined, where $V=(H)^{-1} \cdot \tilde{H}$, H indicates a channel matrix between a sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H \cdot \tilde{H})$ or $(\tilde{H} \cdot \tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission method provided in this embodiment of the present invention can support multiple data stream transmission.

Specifically, in S210, the receiving device may obtain the target precoding matrix V by means of calculation according to the equivalent channel matrix $\tilde{H}$ and the channel matrix H, or may determine the target precoding matrix V from a preset codebook. Details are described below.

Optionally, in this embodiment of the present invention, S210 in which the receiving device determines the target precoding matrix V includes the following steps:

S211. The receiving device determines the equivalent channel matrix $\tilde{H}$ according to the transmission distance D between the sending device and the receiving device and the element spacing of the antenna of the receiving device.

S212. The receiving device determines the target precoding matrix V according to $\tilde{H}$ and H.

The transmission distance D between the sending device and the receiving device is a signal transmission distance between the sending device and the receiving device.

Optionally, in this embodiment of the present invention, the transmission distance D between the sending device and the receiving device is a distance between a central location of the antenna of the sending device and a central location of the antenna of the receiving device.

Specifically, a central location of an antenna Tx of the sending device is a central location in a physical structure of the antenna Tx, for example, may be a center of antenna elements of the antenna Tx. For example, the antenna Tx includes five elements arranged in a straight line, and a location of the third element in the middle may be considered as the central location of the antenna Tx. A central location of an antenna P2 of the receiving device is also a central location in a physical structure of the antenna Rx.

The following uses a MIMO mobile communication scenario shown in FIG. 2 as an example for description. As shown in FIG. 2, no obstacle exists between a sending device and a receiving device, that is, a signal propagation path between the sending device and the receiving device is a direct propagation path without an obstacle. That is, a direct path exists between the sending device and the receiving device. Herein, description is provided by using an example in which an antenna Tx of the sending device (for example, a base station) includes two elements and an antenna Rx of the receiving device (for example, UE) includes two elements. However, the solution in the present invention is not limited to this antenna configuration. A central location of the antenna Tx of the sending device is a central location P1A between the elements T1 and T2. The elements T1 and T2 are evenly distributed on two sides of the central location P1A. For example, distances from T1 and T2 each to the central location P1A are s1/2. A central location of the antenna Rx of the receiving device is a central location P2A between the elements R1 and R2. The elements R1 and R2 are evenly distributed on two sides of the central location P2A of the receive end antenna Rx. For example, distances from R1 and R2 each to the central location P2A are s1/2. A transmission distance D between the sending device and the receiving device may be a distance between the central location P1A and the central location P2A.

The element spacing of the antenna of the receiving device may be a distance s2 between the two elements R1 and R2 of the antenna Rx of the receiving device shown in FIG. 2.

It should also be understood that the receiving device may measure the transmission distance D between the sending device and the receiving device, or may determine the transmission distance D by receiving an indication message that is sent by the sending device and that is used to indicate the transmission distance D. This is not limited in this embodiment of the present invention.

Optionally, in this embodiment of the present invention, before S211 in which the receiving device determines $\tilde{H}$ according to the transmission distance D between the sending device and the receiving device and the element spacing of the antenna of the receiving device, the method further includes the following step:

S213. The receiving device receives an indication message that is sent by the sending device and that is used to indicate the transmission distance D.

Specifically, the sending device obtains the transmission distance D by means of measurement and sends, to the receiving device, the indication message used to indicate the transmission distance D; and the receiving device obtains the transmission distance D according to the indication message. In a subsequent step, the transmission distance D is used to determine $\tilde{H}$.

In S211, the receiving device determines $\tilde{H}$ according to the transmission distance D and the element spacing of the antenna of the receiving device. Specifically, the equivalent channel matrix $\tilde{H}$ may be obtained by means of calculation according to the transmission distance D and the element spacing of the antenna of the receiving device; or the equivalent channel matrix $\tilde{H}$ may be determined based on preset information and according to the transmission distance D and the element spacing of the antenna of the receiving device. For example, correspondences between the transmission distance D and the element spacing of the antenna of the receiving device each and the equivalent channel matrix $\tilde{H}$ are recorded in the preset information. The preset information may be preset system information. This is not limited in the present invention.

Optionally, in this embodiment of the present invention, S211 in which the receiving device determines $\tilde{H}$ according to the transmission distance D between the sending device and the receiving device and the element spacing of the antenna of the receiving device includes the following steps:

S211A. The receiving device determines an equivalent element spacing of an antenna of the sending device according to the transmission distance D and the element spacing of the antenna of the receiving device.

S211B. The receiving device determines the equivalent channel matrix $\tilde{H}$ according to the equivalent element spacing, the element spacing of the antenna of the receiving device, and the transmission distance D.

Specifically, the MIMO communications system shown in FIG. 2 is still used as an example. The transmission distance D between the sending device and the receiving device is the distance D between the central locations P1A and P2A, and an element spacing of the antenna Rx of the receiving device is the distance s2 between the elements R1 and R2. An equivalent element spacing (a distance sg between elements T1' and T2' shown in FIG. 2) of the antenna Tx of the sending device is determined according to the transmission distance D and the element spacing s2.

More specifically, the equivalent element spacing sg of the antenna Tx of the sending device is estimated according to the transmission distance D, the element spacing s2 of the antenna Rx of the receiving device, an azimuth of the antenna Tx of the sending device, and an azimuth of the antenna Rx of the receiving device. The azimuth of the antenna Tx of the sending device may be an angle between the antenna Tx of the sending device and a projection that is of the antenna Tx and that is on a reference plane, or may be an angle between the antenna Tx of the sending device and the antenna Rx of the receiving device. The azimuth of the antenna of the sending device may be defined by using different methods corresponding to different calculation methods, and this is not limited in this embodiment of the present invention. Similarly, a definition of the azimuth of the antenna of the receiving device is not limited either.

Optionally, in this embodiment of the present invention, S211A in which the receiving device determines the equivalent element spacing of the antenna of the sending device according to the transmission distance D and the element spacing of the antenna of the receiving device includes:

The receiving device determines an equivalent element spacing $s_g$ of the antenna of the sending device according to the transmission distance D and the element spacing of the antenna of the receiving device, where $s_g$ meets the following formula:

$$s_g s_2 = \left(p + \frac{1}{\max(N_t, N_r)}\right) \frac{D\lambda}{\sin\theta\sin\omega} \quad (3)$$

$s_2$ is the element spacing of the antenna of the receiving device, D is the transmission distance D, P is a constant, $\lambda$ is a wavelength, $N_t$ is a quantity of elements included in the antenna of the sending device, $N_r$ is a quantity of elements included in the antenna of the receiving device, θ indicates an angle between the antenna of the sending device and a projection that is of the antenna of the sending device and that is on a reference plane, and ω indicates an angle between the antenna of the receiving device and a projection that is of the antenna of the receiving device and that is on the reference plane.

Specifically, the equivalent element spacing $s_g$ may be calculated according to the foregoing formula (3); or the equivalent element spacing $s_g$ may be determined according to another existing related calculation means, so that the equivalent element spacing $s_g$ meets formula (3).

Specifically, as shown in FIG. 3, Tx is a transmit end antenna, Rx is a receive end antenna, sg is an element spacing of the transmit end antenna Tx, and s2 is an element spacing of the receive end antenna Rx. A distance between the transmit end antenna Tx and the receive end antenna Rx in an X-axis direction in a coordinate system XYZ is used as a transmission distance D between a sending device and a receiving device in this embodiment of the present invention. Azimuths of the transmit end antenna Tx are marked as θ and φ, where θ indicates an angle between the antenna of the sending device and a projection that is of the antenna of the sending device and that is on a reference plane, and φ indicates an angle between an X-axis and the projection that is of the antenna of the sending device and that is on the reference plane. The reference plane is an XZ plane shown in FIG. 3. An azimuth of the receive end antenna Rx is marked as ω, where ω indicates an angle between the antenna of the receiving device and a projection that is of the antenna of the receiving device and that is on the reference plane. An effect of the angle φ is approximately ignored in this formula.

It should be understood that the equivalent element spacing sg (the distance between the physical elements T1' and T2' of the antenna Tx shown in FIG. 2) that is of the antenna of the sending device and that is obtained by means of calculation based on formula (3) is greater than a physical element spacing (a distance s1 between the physical elements T1 and T2 of the antenna Tx shown in FIG. 2) of the antenna Tx of the sending device. Compared with channel relevancy when a signal is sent from the elements T1 and T2 to the elements R1 and R2 of the antenna Rx, channel relevancy when a signal is sent from the elements T1' and T2' that have the equivalent element spacing sg to the elements R1 and R2 of the antenna Rx is lower, so that multiple data stream transmission can be supported.

Formula (3) is merely a specific calculation method for determining the element spacing sg of the antenna of the sending device according to the transmission distance D between the sending device and the receiving device and the element spacing s1 of the antenna of the receiving device. It should be understood that the element spacing sg may be determined by using another method for estimating an antenna element spacing in the prior art, and this is not limited in this embodiment of the present invention. It should be understood that when the element spacing sg is estimated by using different calculation methods, different antenna angle information is correspondingly used, and is not limited to the angles θ and ω defined in formula (3).

It should be understood that an equivalent element spacing $s_g$ that does not meet formula (3) may be obtained based on another algorithm. However, it can be ensured that multiple data stream transmission can be supported when a transmit antenna whose elements are arranged according to the equivalent element spacing $s_g$ sends a signal to a receive antenna.

In S211B, the receiving device determines the equivalent channel matrix $\tilde{H}$ according to the equivalent element spacing, the element spacing of the antenna of the receiving device, and the transmission distance D.

Specifically, the MIMO communications system shown in FIG. 2 is still used as an example. For example, measured distances from the equivalent element T1' to R1 and R2 each are respectively $\tilde{d}_{11}$ and $\tilde{d}_{21}$, and measured distances from the equivalent element T2' to R1 and R2 each are respectively $\tilde{d}_{12}$ and $\tilde{d}_{22}$. In this case, the equivalent channel matrix $\tilde{H}$ may be expressed as:

$$\tilde{H} = \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix},$$

where $$k = \frac{2\pi}{\lambda},$$

and λ is a constant.

It should be understood that a channel capacity of the MIMO communications system is directly proportional to a minimum antenna quantity of the transmit end and the receive end. Therefore, in this embodiment of the present invention, a quantity of equivalent elements of the antenna of the sending device is determined according to a minimum antenna quantity of the sending device and the receiving device, that is, a dimension quantity of the equivalent channel matrix $\tilde{H}$ is determined according to the minimum antenna quantity of the sending device and the receiving device. For example, in the MIMO communications system shown in FIG. 2, the minimum antenna quantity of the sending device and the receiving device is 2, and therefore, the equivalent channel matrix $\tilde{H}$ is a 2×2 square matrix. In a MIMO communications system shown in FIG. 4, a minimum antenna quantity of a sending device and a receiving device is 2, and therefore, an equivalent channel matrix $\tilde{H}$ is also a 2×2 square matrix.

It can be learned from the foregoing that in this embodiment of the present invention, the equivalent channel matrix $\tilde{H}$ may be determined according to the following steps: (1) Determine the equivalent element spacing of the antenna of the sending device. (2) Determine the quantity of equivalent elements of the antenna of the sending device according to the quantity of elements included in the antenna of the receiving device. (3) Calculate, according to the quantity of equivalent elements of the antenna of the sending device and the equivalent element spacing, a distance between each equivalent element of the antenna of the sending device and each element included in the antenna of the receiving device. (4) Calculate the equivalent channel matrix $\tilde{H}$ according to the distance determined in (3).

The foregoing describes the solution of determining the equivalent element spacing sg of the antenna of the sending device so as to determine the equivalent channel matrix $\tilde{H}$. In this embodiment of the present invention, optionally, the equivalent channel matrix $\tilde{H}$ may be determined according to the correspondences between the transmission distance D between the sending device and the receiving device and the element spacing of the antenna of the receiving device each and the equivalent channel matrix $\tilde{H}$. For example, the correspondences may be preset in a system. Therefore, in this solution, the equivalent element spacing of the antenna of the sending device does not need to be calculated.

In S212, the target precoding matrix V is determined based on a formula $V=(H)^{-1}\cdot\tilde{H}$ and according to the equivalent channel matrix $\tilde{H}$ determined in S211 and H.

It should be understood that the channel matrix H between the sending device and the receiving device is used to indicate one type of channel state information in the MIMO system. Specifically, the MIMO communications system shown in FIG. 2 is still used as an example, and the channel matrix H between the sending device and the receiving device may be expressed as:

$$\tilde{H} = \begin{bmatrix} e^{-jkd_{11}} & e^{-jkd_{12}} \\ e^{-jkd_{21}} & e^{-jkd_{22}} \end{bmatrix},$$

where $d_{ij}$ indicates a distance between a $j^{th}$ element of the sending device and an $i^{th}$ element of the receiving device, $$k = \frac{2\pi}{\lambda},$$

and $\lambda$ is a constant.

Generally, the sending device obtains the channel matrix H by using feedback information of the receiving device, and description is provided below.

It is assumed that the equivalent channel matrix $\tilde{H}$ obtained in S211 may be expressed as:

$$\tilde{H} = \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix},$$

where a definition of $\tilde{d}_{ij}$ is the same as the foregoing explanation in S212.

The target precoding matrix V is determined according to the following formula:

$$V = (H)^{-1} \cdot \tilde{H} = \begin{bmatrix} e^{-jkd_{11}} & e^{-jkd_{12}} \\ e^{-jkd_{21}} & e^{-jkd_{22}} \end{bmatrix}^{-1} \begin{bmatrix} e^{-jk\tilde{d}_{11}} & e^{-jk\tilde{d}_{12}} \\ e^{-jk\tilde{d}_{21}} & e^{-jk\tilde{d}_{22}} \end{bmatrix} \quad (4)$$

In S220, the signal is sent to the user equipment receiving device according to the target precoding matrix V obtained by means of calculation by using formula (4), so that multiple data stream transmission can be implemented. For specific explanation, refer to the foregoing description with reference to formula (2).

It should be understood that in this embodiment of the present invention, the equivalent elements (that is, T1' and T2' in FIG. 2 or FIG. 4) of the antenna of the sending device are practically nonexistent and are only a concept introduced for describing the equivalent channel matrix $\tilde{H}$. Correspondingly, the equivalent element spacing of the antenna of the sending device is also an intermediate variable introduced for determining the equivalent channel matrix $\tilde{H}$.

For ease of understanding, the MIMO communications system shown in FIG. 2 is used as an example again for description. In a practical operation, a signal is separately sent to the elements R1 and R2 of the antenna Rx of the receiving device by using the physical elements T1 and T2 of the antenna Tx of the sending device. Because the sending device sends the signal to the receiving device according to a target precoding matrix V, $V=(H)^{-1}\cdot\tilde{H}$, and $\tilde{H}$ is an equivalent channel matrix determined according to S112, it may be considered that the sending device separately sends the signal to the elements R1 and R2 of the antenna Rx of the receiving device equivalently based on the equivalent elements T1' and T2'. Therefore, a channel between the signal transmit end and the signal receive end is essentially a channel corresponding to the equivalent channel matrix $\tilde{H}$. That is, in this embodiment of the present invention, in a process in which the sending device sends the signal to the receiving device, the signal is sent by using the physical elements (T1 and T2), but this is equivalent to that the signal is sent by using the equivalent elements (T1' and T2'). A channel corresponding to the signal from the transmit end to the receive end is the channel corresponding to the equivalent channel matrix H instead of a channel corresponding to a channel matrix $\tilde{H}$. This is why $\tilde{H}$ is referred to as the equivalent channel matrix, T1' and T2' in FIG. 2 are referred to as the equivalent elements, and a spacing between T1' and T2' is referred to as the equivalent element spacing in this embodiment of the present invention.

It should be understood that in this embodiment of the present invention, the equivalent elements (that is, T1' and T2' in FIG. 2) of the antenna of the sending device are practically nonexistent and are only a concept introduced for describing the equivalent channel matrix $\tilde{H}$. Correspondingly, the equivalent element spacing of the antenna of the sending device is also an intermediate variable introduced for determining the equivalent channel matrix $\tilde{H}$.

Therefore, in this embodiment of the present invention, a target precoding matrix V is determined, where $V=(H)^{-1}\cdot\tilde{H}$, H indicates a channel matrix between a sending device and a user equipment receiving device, $\tilde{H}$ indicates an equivalent channel matrix between the sending device and the receiving device, $\tilde{H}$ meets that ($\tilde{H}^H\cdot\tilde{H}$) or ($\tilde{H}\cdot\tilde{H}^H$) is a diagonal matrix, and $\tilde{H}$ is related to a transmission distance between the sending device and the receiving device and an element spacing of an antenna of the receiving device. Then, a signal is sent to the receiving device based on the target precoding matrix V, so that multiple data stream transmission can be implemented. Compared with a prior-art solution in which multiple data stream transmission is implemented by increasing a spacing between transmit end antennas, in this embodiment of the present invention, multiple data stream transmission can be implemented in a direct path condition without modifying original antenna architectures of the sending device and the receiving device. Therefore, an implementation cost can be reduced, and solution applicability is improved.

In addition, for mobile user equipment, in this embodiment of the present invention, a proper target precoding matrix V may be correspondingly determined according to a change of a transmission distance between a sending device and user equipment, so as to send a signal to the user equipment receiving device according to the target precoding matrix V, so that multiple data stream transmission of a mobile user can be implemented without a physical modification of an antenna configuration of the sending device.

Therefore, a cost is reduced, and flexibility and applicability of multiple data stream transmission implementation are improved.

With reference to the communications system shown in FIG. 2, the foregoing uses an example to describe a process in which the target precoding matrix V is determined based on $V=(H)^{-1}\cdot\tilde{H}$ and by determining the equivalent channel matrix $\tilde{H}$. It should be understood that the foregoing description with reference to FIG. 2 is merely an example instead of a limitation.

Likewise, it should be noted that in S213, the target precoding matrix V is calculated based on $V=(H)^{-1}\cdot\tilde{H}$, and the channel matrix H may not be a square matrix. In this case, $(H)^{-1}$ refers to obtaining a pseudo-inverse matrix for the channel matrix H, that is, $H^H\cdot(H\cdot H^H)^{-1}$ or $(H^H\cdot H)^{-1}\cdot H^H$. For detailed content, refer to the foregoing description with reference to FIG. 4, and details are not described herein again.

Therefore, in this embodiment of the present invention, a target precoding matrix V is determined, where $V=(H)^{-1}\cdot\tilde{H}$, H indicates a channel matrix between a sending device and a user equipment receiving device, $\tilde{H}$ indicates an equivalent channel matrix between the sending device and the receiving device, $\tilde{H}$ meets that $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. A signal is sent to the user equipment receiving device according to the target precoding matrix V, so that multiple data stream transmission can be implemented for a mobile user. In addition, a modification of an antenna configuration of the sending device is avoided, and a cost is reduced.

In this embodiment of the present invention, the receiving device obtains the channel matrix H between the sending device and the receiving device according to a reference signal sent by the sending device. Specifically, description is provided below by using an example in which the sending device is a base station and the receiving device is user equipment UE.

(1) The UE Receives a Reference Signal Sent by the Base Station.

The reference signal may be at least one of the following signals: a channel state information reference signal (channel state information Reference Signal, CSI RS), a demodulation reference signal (demodulation RS, DM RS), or a cell-specific reference signal (cell-specific RS, CRS).

Optionally, the user equipment UE may learn, by receiving an eNB notification, specifically, for example, radio resource control (Radio Resource Control, RRC) signaling or downlink control information DCI or based on a cell identifier ID, a resource configuration of the reference signal sent by the base station, and receive the reference signal on a time-frequency resource indicated by the resource configuration.

(2) The UE Determines a Channel Matrix H Between the Base Station and the UE by Measuring the Reference Signal.

Optionally, as shown in FIG. 6, in this embodiment of the present invention, S210 in which the receiving device determines the target precoding matrix V includes the following step:

S213. The receiving device determines the target precoding matrix V from N precoding matrices included in a preset codebook, where an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ is a diagonal matrix, $\tilde{H}_i$ is related to a transmission distance between the transmit end device and the receive end device and an element spacing of an antenna of the receive end device, i is 1, 2, . . . , or N, and N is a positive integer.

Specifically, the preset codebook is preset in the system, that is, the sending device and the receiving device share the preset codebook. Each precoding matrix in the preset codebook is related to the transmission distance between the transmit end device and the receive end device.

Specifically, it is assumed that the target precoding matrix V determined from the preset codebook is $V=(H)^{-1}\cdot\tilde{H}_x$. An element spacing of a receive end device of a channel corresponding to $\tilde{H}_x$ has a mathematical relationship with the transmission distance D between the sending device and the receiving device and the element spacing of the antenna of the receiving device. Specifically, the relationship is that shown in formula (3).

Optionally, each precoding matrix in the preset codebook in this embodiment of the present invention may be determined according to the method described above in S211 and S212, or may be determined by using another method. This is not limited in this embodiment of the present invention, as long as each precoding matrix $V_i$ included in the preset codebook meets the following characteristic: $V_i=(H_i)^{-1}\cdot\tilde{H}_i$, where $H_i$ indicates the channel matrix between the transmit end device and the receive end device, $\tilde{H}_i$ indicates the equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ or is a diagonal matrix, $\tilde{H}_i$ is related to the transmission distance between the transmit end device and the receive end device and the element spacing of the antenna of the receive end device.

Optionally, in this embodiment of the present invention, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

Specifically, for example, a preset codebook R is divided into multiple codebook subsets $C_i$ according to different transmission distances. For example, when a signal transmission distance is 40 meters, a codebook subset is C1; when a signal transmission distance is 50 meters, a codebook subset is C2; and when a signal transmission distance is 60 meters, a codebook subset is C3. Each codebook subset $C_i$ includes one or more precoding matrices, which may also be referred to as codewords.

S213 in which the receiving device determines the target precoding matrix V from the N precoding matrices included in the preset codebook includes the following steps:

S213A. The receiving device determines a target codebook subset from the M codebook subsets, where an absolute value of a difference between a transmission distance corresponding to the target codebook subset and the transmission distance D between the sending device and the receiving device is less than a preset threshold.

Specifically, it is assumed that the preset threshold is 5 meters, and the transmission distance D between the sending device and the receiving device is 43 meters. In this case, a codebook subset corresponding to a transmission distance may be selected from the preset codebook as the codebook subset, where an absolute value of a difference between the transmission distance and 43 is less than 5. For example, a preset codebook R is divided into multiple codebook subsets C, according to different transmission distances. For example, when a signal transmission distance is 40 meters, a codebook subset is C1; when a signal transmission distance is 50 meters, a codebook subset is C2; and when a signal transmission distance is 60 meters, a codebook subset is C3. In this embodiment of the present invention, the codebook subset C1 is used as the target codebook subset.

S213B. The receiving device determines, according to the channel matrix H, the target precoding matrix V from one or more precoding matrices included in the target codebook subset.

In S213A, specifically, the target codebook subset may be determined according to the transmission distance D between the sending device and the receiving device, or the target codebook subset may be determined by receiving an indication message that is sent by the sending device and that is used to indicate the target codebook subset. This is not limited in this embodiment of the present invention.

Optionally, in this embodiment of the present invention, S213A in which the receiving device determines the target codebook subset from the M codebook subsets includes:

The receiving device determines the target codebook subset from the M codebook subsets according to the transmission distance D between the sending device and the receiving device and transmission distances corresponding to different codebook subsets in the M codebook subsets, where the absolute value of the difference between the transmission distance corresponding to the target codebook subset and the transmission distance D between the sending device and the receiving device is less than the preset threshold.

Specifically, the receiving device obtains the transmission distance D between the sending device and the receiving device by means of measurement or by receiving an indication message from the sending device, and then determines, based on the transmission distance D, the target codebook subset from the M codebook subsets included in the preset codebook.

Alternatively, the receiving device determines the target codebook subset from the M codebook subsets according to the indication message that is sent by the sending device and that is used to indicate the target codebook subset.

Specifically, the sending device measures the transmission distance D between the sending device and the user equipment receiving device, and then determines the target codebook subset from the preset codebook according to the transmission distance D. It is assumed that each codebook subset included in the preset codebook has a unique serial number, and the sending device may send a serial number of the target codebook subset to the receiving device. Correspondingly, the receiving device receives an indication message that is sent by the sending device and that is used to indicate the serial number of the target codebook subset, and the receiving device locates the target codebook subset in the preset codebook according to the serial number of the target codebook subset.

Optionally, in this embodiment of the present invention, S213B in which the receiving device determines, according to the channel matrix H, the target precoding matrix V from one or more precoding matrices included in the target codebook subset includes:

The receiving device determines, according to the channel matrix H and from the one or more precoding matrices included in the target codebook subset, the target precoding matrix V based on at least one criterion in the following preset criteria: a channel capacity maximization criterion, a channel throughput maximization criterion, or a channel chordal distance minimization criterion.

Optionally, in this embodiment of the present invention, a rank of each precoding matrix in the N precoding matrices in the preset codebook is at least 2.

It should be understood that the preset codebook in this embodiment of the present invention may be preset in the system, that is, the preset codebook is known to the sending device and the receiving device. Specifically, each precoding matrix in the preset codebook may be determined according to the method described above in S211 and S212. For example, precoding matrices corresponding to different communication scenarios are estimated in advance. Specifically, in a communication scenario shown in FIG. 4, it is assumed that a transmit end antenna Tx includes four elements {T1, T2, T3, and T4}, a receive end antenna Rx includes two elements {R1 and R2}, and a transmission distance between a transmit end and a receive end in the system is D (for example, a distance between a central location P1A of the transmit end antenna Tx and a central location P2A of the receive end antenna Rx).

(1) A channel matrix H between the transmit end and the receive end is:

$$H = \begin{bmatrix} e^{-jkd_{11}} & e^{-jkd_{12}} & e^{-jkd_{13}} & e^{-jkd_{14}} \\ e^{-jkd_{21}} & e^{-jkd_{22}} & e^{-jkd_{23}} & e^{-jkd_{24}} \end{bmatrix},$$

where $d_{ij}$ indicates a distance between a $j^{th}$ antenna element of the transmit end and an $i^{th}$ antenna element of the receive end, $$k = \frac{2\pi}{\lambda},$$

and $\lambda$ is a constant.

(2) Determine an equivalent channel matrix $\tilde{H}$ according to the transmission distance D and an element spacing of the receive end antenna.

It should be understood that a channel capacity of the MIMO communications system is directly proportional to a minimum antenna quantity of the transmit end and the receive end. In the mobile system shown in FIG. 4, the transmit end antenna has four elements, and the receive end antenna has two elements. That is, the minimum antenna quantity of the transmit end and the receive end is 2. Therefore, a dimension quantity of the equivalent channel matrix $\tilde{H}$ is at most 2. For example, the equivalent channel matrix $\tilde{H}$ is a 2×2 square matrix. Equivalent channels indicated by the equivalent channel matrix $\tilde{H}$ are transmission channels between two transmit elements and two receive elements.

For a specific method for determining the equivalent channel matrix $\tilde{H}$, refer to the foregoing description. For brevity, details are not described herein again.

(3) Calculate a target precoding matrix V based on a formula $V=(H)^{-1} \cdot \tilde{H}$.

It should be understood that in this embodiment of the present invention, the channel matrix H is a 2×4 matrix, that is, the channel matrix H is not a full-rank square matrix. In this case, an inverse matrix of the channel matrix H is a pseudo-inverse matrix $H^H(HH^H)^{-1}$ or $(H^HH)^{-1}H^H$ of the channel matrix H.

Therefore, the target precoding matrix V may be calculated according to the following formula:

$$V = H^H \cdot (HH^H)^{-1} \cdot \tilde{H} \quad (5)$$

$$\text{or } V = (H^H H)^{-1} H^H \cdot \tilde{H} \quad (6)$$

So far, the precoding matrix V corresponding to the communication scenario shown in FIG. 4 is obtained. The precoding matrix V is used as a codebook in a preset codebook, and a correspondence between V and the transmission distance D is established.

Similarly, for another communication scenario, for example, a communication scenario in which a signal transmit end and a signal receive end have other different signal transmission distances, a precoding matrix for implementing multiple data stream transmission may be estimated by using the foregoing method.

The preset codebook is finally constructed according to precoding matrices obtained by means of estimation in different scenarios, so that the preset codebook may be used in subsequent communication.

Optionally, in this embodiment of the present invention, S220 in which the receiving device sends, to the sending device, the indication message used to indicate the target precoding matrix V, so that the sending device sends the signal to the receiving device according to the target precoding matrix V includes:

The receiving device sends, to the sending device, the indication message used to indicate that the sending device determines the target precoding matrix V from the preset codebook.

Specifically, description is provided below by using an example in which the sending device is a base station and the receiving device is user equipment UE.

Specifically, each precoding matrix included in the preset codebook is corresponding to one serial number, and different precoding matrices are corresponding to different serial numbers. In this embodiment of the present invention, the UE sends, to the base station, an indication message used to indicate a serial number of the target precoding matrix V in the preset codebook.

Optionally, in this embodiment of the present invention, S220 in which the UE sends, to the base station, the indication message used to indicate the target precoding matrix V includes:

The UE sends a precoding matrix indicator (precoding matrix indicator, "PMI" for short) to the base station, where the PMI is corresponding to the target precoding matrix selected from the preset codebook, and the base station obtains the target precoding matrix from the preset codebook according to the PMI.

Specifically, for example, the PMI may include only one specific value. In this case, the PMI directly indicates the target precoding matrix. For example, the preset codebook has 256 different precoding matrices in total; in this case, PMI=0, . . . , and 255 may be respectively used to indicate precoding matrices whose serial numbers are 0, 1, . . . , and 255.

Optionally, in this embodiment of the present invention, that the UE sends the precoding matrix indicator PMI to the base station includes:

The UE sends precoding matrix indicators PMI1 and PMI2 to the base station.

Specifically, the precoding matrix indicators PMI1 and PMI2 have different time-domain or frequency-domain granularities; or PMI1 and PMI2 indicate channel characteristics of different periods or bandwidth, or are obtained based on different subframe periods or sub-band sizes.

Further, the precoding matrix indicators PMI1 and PMI2 are sent to the base station in different time periods.

Optionally, in this embodiment of the present invention, S220 in which the UE sends, to the base station, the indication message used to indicate the target precoding matrix V includes:

The UE sends the indication message to the base station by using a physical uplink control channel (Physical Uplink Control Channel, "PUCCH" for short) or a physical uplink shared channel (Physical Uplink Shared Channel, "PUSCH" for short).

Therefore, in this embodiment of the present invention, a target precoding matrix V is determined, where $V = (H)^{-1} \cdot \tilde{H}$, H indicates a channel matrix between a sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H \cdot \tilde{H})$ or $(\tilde{H} \cdot \tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission method provided in this embodiment of the present invention can support multiple data stream transmission.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes the signal transmission methods according to the embodiments of the present invention with reference to FIG. 1 to FIG. 6, and the following describes in detail signal transmission devices according to embodiments of the present invention with reference to FIG. 7 to FIG. 10.

Figure 7:
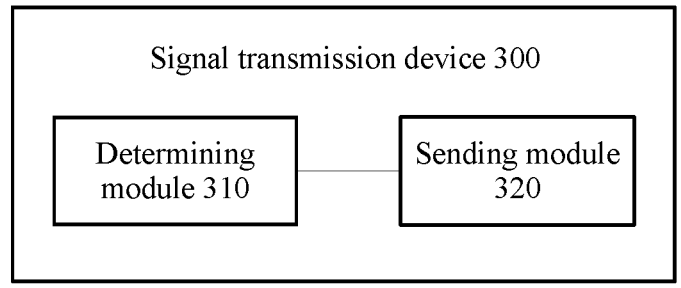
FIG. 7 shows a schematic block diagram of a signal transmission device according to an embodiment of the present invention.

FIG. 7 shows a schematic block diagram of a signal transmission device 300 according to an embodiment of the present invention. The device 300 includes:

a determining module 310, configured to determine a target precoding matrix V, where $V = (H)^{-1} \cdot \tilde{H}$, H indicates a channel matrix between the device and a receiving device, $\tilde{H}$ indicates an equivalent channel matrix between the device and the receiving device, $(\tilde{H}^H \cdot \tilde{H})$ or $(\tilde{H} \cdot \tilde{H}^H)$ is a diagonal matrix, and $\tilde{H}$ is related to a transmission distance D between the device and the receiving device and an element spacing of an antenna of the receiving device; and a sending module 320, configured to send a signal to the receiving device according to the target precoding matrix V determined by the determining unit.

Specifically, the device 300 may be a transmit end device, for example, a base station.

Therefore, in this embodiment of the present invention, a target precoding matrix V is determined, where $V = (H)^{-1} \cdot \tilde{H}$, H indicates a channel matrix between a sending device and a receiving device, $\tilde{H}$ indicates an equivalent channel matrix between the sending device and the receiving device, ($\tilde{H}^H \cdot \tilde{H}$) or ($\tilde{H} \cdot \tilde{H}^H$) is a diagonal matrix, and $\tilde{H}$ is related to a transmission distance between the sending device and the receiving device and an element spacing of an antenna of the receiving device. It should be understood that because $\tilde{H}$ meets a characteristic that ($\tilde{H}^H \cdot \tilde{H}$) or ($\tilde{H} \cdot \tilde{H}^H$) is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

For details about the equivalent channel matrix $\tilde{H}$, refer to the foregoing description. For brevity, details are not described herein again.

Specifically, the determining module 310 may obtain the target precoding matrix V by means of calculation according to H and $\tilde{H}$, or may determine the target precoding matrix V by using an indication message used to indicate the target precoding matrix V.

Optionally, in this embodiment of the present invention, the determining module 310 includes:

a first determining unit 311, configured to determine the equivalent channel matrix $\tilde{H}$ according to the transmission distance D and the element spacing of the antenna of the receiving device; and a second determining unit 312, configured to determine the target precoding matrix V according to $\tilde{H}$ determined by the first determining unit and H.

Specifically, the first determining unit 311 may obtain the equivalent channel matrix $\tilde{H}$ by means of calculation according to the transmission distance D and the element spacing of the antenna of the receiving device, or may determine the equivalent channel matrix $\tilde{H}$ based on preset information and according to the transmission distance D and the element spacing of the antenna of the receiving device. For example, correspondences between the transmission distance D and the element spacing of the antenna of the receiving device each and the equivalent channel matrix $\tilde{H}$ are recorded in the preset information. The preset information may be preset system information. This is not limited in the present invention.

Optionally, in this embodiment of the present invention, the first determining unit 311 includes:

a first determining subunit 311A, configured to determine an equivalent element spacing of an antenna of the device according to the transmission distance D and the element spacing of the antenna of the receiving device; and a second determining subunit 311B, configured to determine the equivalent channel matrix $\tilde{H}$ according to the equivalent element spacing that is of the antenna of the device and that is determined by the first determining subunit, the element spacing of the antenna of the receiving device, and the transmission distance D.

Optionally, in this embodiment of the present invention, the first determining subunit 311A is specifically configured to determine an equivalent element spacing $s_g$ of the antenna of the device according to the transmission distance D and the element spacing of the antenna of the receiving device, and $s_g$ meets the following formula:

$$s_g s_2 = \left( p + \frac{1}{\max(N_t, N_r)} \right) \frac{D\lambda}{\sin\theta \sin\omega} \quad (3)$$

$s_2$ is the element spacing of the antenna of the receiving device, D is the transmission distance D, P is a constant, $\lambda$ is a wavelength, $N_t$ is a quantity of elements included in the antenna of the device, $N_r$ is a quantity of elements included in the antenna of the receiving device, $\theta$ indicates an angle between the antenna of the device and a projection that is of the antenna of the device and that is on a reference plane, and $\omega$ indicates an angle between the antenna of the receiving device and a projection that is of the antenna of the receiving device and that is on the reference plane.

Specifically, the first determining subunit 311A may calculate the equivalent element spacing $s_g$ according to the foregoing formula (3); or may determine the equivalent element spacing $s_g$ according to another existing related calculation means, so that the equivalent element spacing $s_g$ meets formula (3). It should be understood that the first determining subunit 311A may obtain, based on another algorithm, an equivalent element spacing $s_g$ that does not meet formula (3). However, it can be ensured that multiple data stream transmission can be supported when a transmit antenna whose elements are arranged according to the equivalent element spacing $s_g$ sends a signal to a receive antenna.

Optionally, in this embodiment of the present invention, the device 300 further includes:

a first receiving module 330, configured to: before the first determining unit determines the equivalent channel matrix $\tilde{H}$, receive an indication message that is sent by the receiving device and that is used to indicate the transmission distance D.

Optionally, in this embodiment of the present invention, the device 300 further includes:

a second receiving module 340, configured to: before the determining module determines the target precoding matrix V, receive an indication message that is sent by the receiving device and that is used to indicate the channel matrix H.

Optionally, in this embodiment of the present invention, the determining module 310 includes:

a first receiving unit, configured to receive an indication message that is sent by the receiving device and that is used to instruct to determine the target precoding matrix V from a preset codebook, where the preset codebook includes N precoding matrices, and an $i^{th}$ precoding matrix $V_i$ in the N precoding matrices meets $V_i = (H_i)^{-1} \cdot \tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that (($\tilde{H}_i)^H \cdot \tilde{H}_i$) or ($\tilde{H}_i \cdot (\tilde{H}_i)^H$) is a diagonal matrix, $\tilde{H}_i$ is related to a transmission distance between the transmit end device and the receive end device and an element spacing of an antenna of the receive end device, i is 1, 2, . . . , or N, and N is a positive integer; and a third determining unit, configured to determine the target precoding matrix V from the preset codebook according to the indication message received by the first receiving unit.

Optionally, in this embodiment of the present invention, the first receiving unit is specifically configured to receive the indication message, where the indication message includes information used to indicate a serial number of the target precoding matrix V in the preset codebook; and the third determining unit is specifically configured to obtain the target precoding matrix V from the preset codebook according to the serial number received by the first receiving unit.

Optionally, in this embodiment of the present invention, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

Optionally, in this embodiment of the present invention, a rank of each precoding matrix in the N precoding matrices included in the preset codebook is at least 2.

Optionally, in this embodiment of the present invention, the determining module 310 includes:

a second receiving unit, configured to receive an indication message that is sent by the receiving device and that is used to indicate the channel matrix H;

a third receiving unit, configured to receive an indication message that is sent by the receiving device and that is used to indicate the equivalent channel matrix $\tilde{H}$; and a fourth determining unit, configured to determine the target precoding matrix V according to H received by the second receiving unit and $\tilde{H}$ received by the third receiving unit.

Optionally, in this embodiment of the present invention, the transmission distance D between the device and the receiving device is a distance between a central location of the antenna of the device and a central location of the antenna of the receiving device.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

It should be understood that the device 300 according to this embodiment of the present invention may be corresponding to a sending device in a signal transmission method according to an embodiment of the present invention, and the foregoing and other operations and/or functions of the modules of the device 300 are respectively used to implement corresponding procedures of the methods in FIG. 1 to FIG. 6. For brevity, details are not described herein again.

Figure 8:
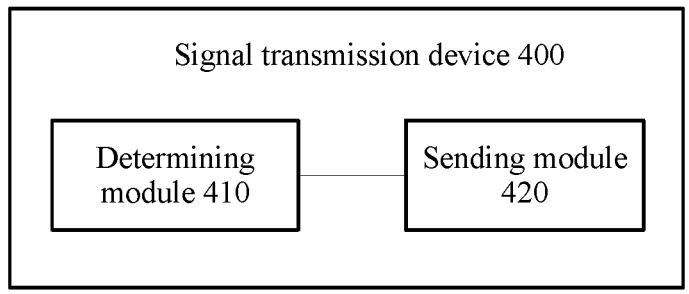
FIG. 8 shows another schematic block diagram of a signal transmission device according to an embodiment of the present invention.

FIG. 8 shows a schematic block diagram of a signal transmission device 400 according to an embodiment of the present invention. The device 400 includes:

a determining module 410, configured to determine a target precoding matrix V, where $V=(H)^{-1}\cdot\tilde{H}$, H indicates a channel matrix between a sending device and the device, $\tilde{H}$ indicates an equivalent channel matrix between the sending device and the device, $\tilde{H}$ meets that $(\tilde{H}^H\cdot\tilde{H})$ or $(\tilde{H}\cdot\tilde{H}^H)$ is a diagonal matrix, and $\tilde{H}$ is related to a transmission distance D between the sending device and the device and an element spacing of an antenna of the device; and a sending module 420, configured to send, to the sending device, an indication message used to indicate the target precoding matrix V determined by the determining module, so that the sending device sends a signal to the device according to the target precoding matrix V.

Specifically, the device 400 may be a receive end device, for example, user equipment UE.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

For details about the equivalent channel matrix $\tilde{H}$, refer to the foregoing description. For brevity, details are not described herein again.

Specifically, the determining module 410 may obtain the target precoding matrix V by means of calculation according to H and $\tilde{H}$, or may determine the target precoding matrix V by using a preset codebook.

Optionally, in this embodiment of the present invention, the determining module 410 includes:

a first determining unit 411, configured to determine $\tilde{H}$ according to the transmission distance D and the element spacing of the antenna of the device; and a second determining unit 412, configured to determine the target precoding matrix V according to $\tilde{H}$ determined by the first determining unit and H.

Specifically, the first determining unit 411 may obtain the equivalent channel matrix $\tilde{H}$ by means of calculation according to the transmission distance D and the element spacing of the antenna of the device, or may determine the equivalent channel matrix $\tilde{H}$ based on preset information and according to the transmission distance D and the element spacing of the antenna of the device. For example, correspondences between the transmission distance D and the element spacing of the antenna of the device each and the equivalent channel matrix $\tilde{H}$ are recorded in the preset information. The preset information may be preset system information. This is not limited in the present invention.

Optionally, in this embodiment of the present invention, the first determining unit 411 includes:

a first determining subunit 411A, configured to determine an equivalent element spacing of an antenna of the sending device according to the transmission distance D and the element spacing of the antenna of the device; and a second determining subunit 411B, configured to determine $\tilde{H}$ according to the equivalent element spacing that is of the antenna of the sending device and that is determined by the first determining subunit, the element spacing of the antenna of the device, and the transmission distance D.

Optionally, in this embodiment of the present invention, the first determining subunit 411A is specifically configured to determine an equivalent element spacing $s_g$ of the antenna of the sending device according to the transmission distance D and the element spacing of the antenna of the device, and $s_g$ meets the following formula:

$$s_g s_2 = \left(p + \frac{1}{\max(N_t, N_r)}\right) \frac{D\lambda}{\sin\theta \sin\omega} \qquad (3)$$

$s_2$ is the element spacing of the antenna of the device, D is the transmission distance D, P is a constant, $\lambda$ is a wavelength, $N_t$ is a quantity of elements included in the antenna of the sending device, $N_r$ is a quantity of elements included in the antenna of the device, $\theta$ indicates an angle between the antenna of the sending device and a projection that is of the antenna of the sending device and that is on a reference plane, and $\omega$ indicates an angle between the antenna of the device and a projection that is of the antenna of the device and that is on the reference plane.

Specifically, the first determining subunit 411A may calculate the equivalent element spacing $s_g$ according to the foregoing formula (3); or may determine the equivalent element spacing $s_g$ according to another existing related calculation means, so that the equivalent element spacing $s_g$ meets formula (3). It should be understood that the first determining subunit 411A may obtain, based on another algorithm, an equivalent element spacing $s_g$ that does not meet formula (3). However, it can be ensured that multiple data stream transmission can be supported when a transmit antenna whose elements are arranged according to the equivalent element spacing $s_g$ sends a signal to a receive antenna.

Optionally, in this embodiment of the present invention, the device 400 further includes:

a receiving module 430, configured to: before the first determining unit determines $\tilde{H}$, receive an indication message that is sent by the sending device and that is used to indicate the transmission distance D.

Optionally, in this embodiment of the present invention, the determining module 410 is specifically configured to determine the target precoding matrix V from N precoding matrices included in a preset codebook, where an $i^{th}$ precoding matrix $V_i$ in the N precoding matrices meets $V_i = (H_i)^{-1} \cdot \tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H \cdot \tilde{H}_i)$ or $(\tilde{H}_i \cdot (\tilde{H}_i)^H)$ is a diagonal matrix, $\tilde{H}_i$ is related to a transmission distance between the transmit end device and the receive end device and an element spacing of an antenna of the receive end device, i is 1, 2, ..., or N, and N is a positive integer.

Optionally, in this embodiment of the present invention, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

The determining module 410 includes:

a third determining unit 413, configured to determine a target codebook subset from the M codebook subsets, where an absolute value of a difference between a transmission distance corresponding to the target codebook subset and the transmission distance D between the sending device and the device is less than a preset threshold; and a fourth determining unit 414, configured to determine, according to the channel matrix H, the target precoding matrix V from one or more precoding matrices included in the target codebook subset determined by the third determining unit.

Optionally, in this embodiment of the present invention, the third determining unit 413 is specifically configured to determine the target codebook subset from the M codebook subsets according to the transmission distance D between the sending device and the device and transmission distances corresponding to different codebook subsets in the M codebook subsets, where the absolute value of the difference between the transmission distance corresponding to the target codebook subset and the transmission distance D is less than the preset threshold; or the third determining unit 413 is specifically configured to determine the target codebook subset from the M codebook subsets according to an indication message that is sent by the sending device and that is used to indicate the target codebook subset.

Optionally, in this embodiment of the present invention, the fourth determining unit 414 is specifically configured to determine, according to the channel matrix H and from the one or more precoding matrices included in the target codebook subset, the target precoding matrix V based on at least one criterion in the following preset criteria: a channel capacity maximization criterion, a channel throughput maximization criterion, or a channel chordal distance minimization criterion.

Optionally, in this embodiment of the present invention, a rank of each precoding matrix in the N precoding matrices in the preset codebook is at least 2.

Optionally, in this embodiment of the present invention, the transmission distance D between the sending device and the device is a distance between a central location of the antenna of the sending device and a central location of the antenna of the device.

Therefore, in this embodiment of the present invention, a target precoding matrix V is determined, where $V = (H)^{-1} \cdot \tilde{H}$, H indicates a channel matrix between a sending device and a receiving device, $\tilde{H}$ indicates an equivalent channel matrix between the sending device and the receiving device, $(\tilde{H}^H \cdot \tilde{H})$ or $(\tilde{H} \cdot \tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H \cdot \tilde{H})$ or $(\tilde{H} \cdot \tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

It should be understood that the signal transmission device 400 according to this embodiment of the present invention may be corresponding to a receiving device in a signal transmission method according to an embodiment of the present invention, and the foregoing and other operations and/or functions of the modules of the device 400 are respectively used to implement corresponding procedures of the methods in FIG. 1 to FIG. 6. For brevity, details are not described herein again.

Figure 9:
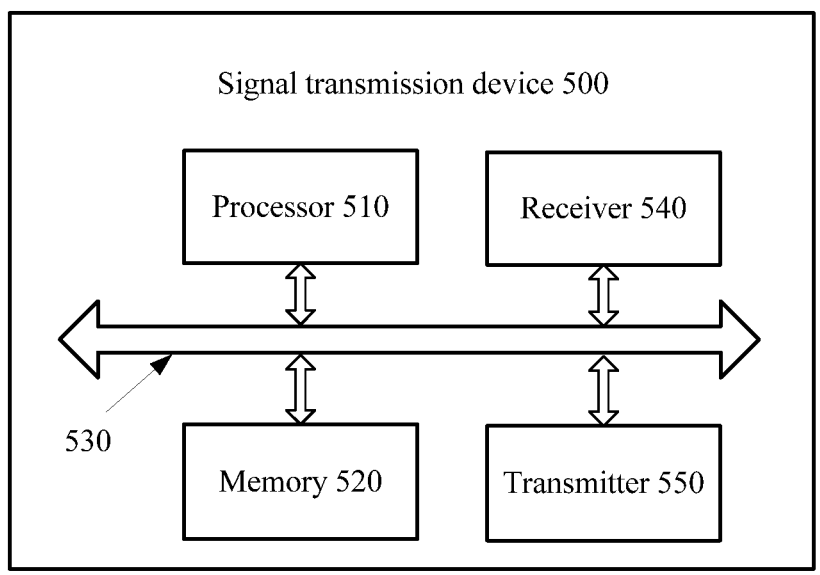
FIG. 9 shows a schematic block diagram of a signal transmission device according to another embodiment of the present invention.

As shown in FIG. 9, an embodiment of the present invention further provides a signal transmission device 500. The device 500 includes a processor 510, a memory 520, a bus system 530, a receiver 540, and a transmitter 550. The processor 510, the memory 520, the receiver 540, and the transmitter 550 are connected to each other by using the bus system 530, the memory 520 is configured to store an instruction, and the processor 510 is configured to execute the instruction stored in the memory 520 to control the receiver 540 to receive a signal and control the transmitter 550 to send a signal. The processor 510 is configured to determine a target precoding matrix V, where $V=(H)^{-1}\cdot\tilde{H}$, H indicates a channel matrix between the device and a receiving device, $\tilde{H}$ indicates an equivalent channel matrix between the device and the receiving device, $(\tilde{H}^H\cdot\tilde{H})$ or $(\tilde{H}\cdot\tilde{H}^H)$ is a diagonal matrix, and $\tilde{H}$ is related to a transmission distance D between the device and the receiving device and an element spacing of an antenna of the receiving device. The transmitter 550 is configured to send a signal to the receiving device according to the target precoding matrix V.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

Optionally, in this embodiment of the present invention, the processor 510 is specifically configured to determine the equivalent channel matrix $\tilde{H}$ according to the transmission distance D and the element spacing of the antenna of the receiving device, and determine the target precoding matrix V according to H and $\tilde{H}$.

Optionally, in this embodiment of the present invention, the processor 510 is specifically configured to determine an equivalent element spacing of an antenna of the device according to the transmission distance D and the element spacing of the antenna of the receiving device, and determine the equivalent channel matrix $\tilde{H}$ according to the equivalent element spacing of the antenna of the device, the element spacing of the antenna of the receiving device, and the transmission distance D.

Optionally, in this embodiment of the present invention, the processor 510 is specifically configured to determine an equivalent element spacing $s_g$ of the antenna of the device according to the transmission distance D and the element spacing of the antenna of the receiving device, and $s_g$ meets the following formula:

$$s_g s_2 = \left(p + \frac{1}{\max(N_t, N_r)}\right) \frac{D\lambda}{\sin\theta\sin\omega} \qquad (3)$$

$s_2$ is the element spacing of the antenna of the receiving device, D is the transmission distance D, P is a constant, $\lambda$ is a wavelength, $N_t$ is a quantity of elements included in the antenna of the device, $N_r$ is a quantity of elements included in the antenna of the receiving device, $\theta$ indicates an angle between the antenna of the device and a projection that is of the antenna of the device and that is on a reference plane, and $\omega$ indicates an angle between the antenna of the receiving device and a projection that is of the antenna of the receiving device and that is on the reference plane.

Optionally, in this embodiment of the present invention, the receiver 540 is configured to: before the processor 510 determines the equivalent channel matrix $\tilde{H}$ according to the transmission distance D and the element spacing of the antenna of the receiving device, receive an indication message that is sent by the receiving device and that is used to indicate the transmission distance D.

Optionally, in this embodiment of the present invention, the receiver 540 is configured to: before the processor 510 determines the target precoding matrix V, receive an indication message that is sent by the receiving device and that is used to indicate the channel matrix H.

Optionally, in this embodiment of the present invention, the receiver 540 is configured to receive an indication message that is sent by the receiving device and that is used to instruct to determine the target precoding matrix V from a preset codebook, where the preset codebook includes N precoding matrices, and an $i^{th}$ precoding matrix $V_i$ in the N precoding matrices meets $V_i=(H_i)^{-1}\cdot\tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H\cdot\tilde{H}_i)$ or $(\tilde{H}_i\cdot(\tilde{H}_i)^H)$ is a diagonal matrix, $\tilde{H}_i$ is related to a transmission distance between the transmit end device and the receive end device and an element spacing of an antenna of the receive end device, i is 1, 2, . . . , or N, and N is a positive integer.

The processor 510 is specifically configured to determine the target precoding matrix V from the preset codebook according to the indication message.

Optionally, in this embodiment of the present invention, the receiver 540 is specifically configured to receive the indication message, where the indication message includes information used to indicate a serial number of the target precoding matrix V in the preset codebook.

The processor 510 is specifically configured to obtain the target precoding matrix V from the preset codebook according to the serial number.

Optionally, in this embodiment of the present invention, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

Optionally, in this embodiment of the present invention, a rank of each precoding matrix in the N precoding matrices included in the preset codebook is at least 2.

Optionally, in this embodiment of the present invention, the receiver 540 is specifically configured to receive an indication message that is sent by the receiving device and that is used to indicate the channel matrix H; and receive an indication message that is sent by the receiving device and that is used to indicate the equivalent channel matrix $\tilde{H}$. The processor 510 is specifically configured to determine the target precoding matrix V according to H and $\tilde{H}$.

Optionally, in this embodiment of the present invention, the transmission distance D between the device and the receiving device is a distance between a central location of the antenna of the device and a central location of the antenna of the receiving device.

It should be understood that in this embodiment of the present invention, the processor 510 may be a central processing unit (Central Processing Unit, "CPU" for short), or the processor 510 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor or the processor may be any conventional processor, or the like.

The memory 520 may include a read-only memory and a random access memory, and provides an instruction and data for the processor 510. A part of the memory 520 may further include a non-volatile random access memory. For example, the memory 520 may further store information about a device type.

In addition to a data bus, the bus system 530 may further include a power bus, a control bus, a status signal bus, and the like. However, for clarity of description, various buses are marked as the bus system 530 in the figure.

In an implementation process, the steps in the foregoing method may be completed by using an integrated logic circuit of hardware in the processor 510 or an instruction in a form of software. Steps of the methods disclosed with reference to the embodiments of the present invention may be directly executed and completed by a hardware processor, or may be executed and completed by using a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 520. The processor 510 reads information in the memory 520, and completes the steps of the foregoing method in combination with hardware of the processor 510. To avoid repetition, details are not described herein again.

It should be understood that the signal transmission device 500 according to this embodiment of the present invention may be corresponding to a sending device in a signal transmission method according to an embodiment of the present invention, and may be corresponding to the signal transmission device 300 according to the embodiment of the present invention, and the foregoing and other operations and/or functions of the modules of the device 300 are respectively used to implement corresponding procedures of the methods in FIG. 1 to FIG. 6. For brevity, details are not described herein again.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

Figure 10:
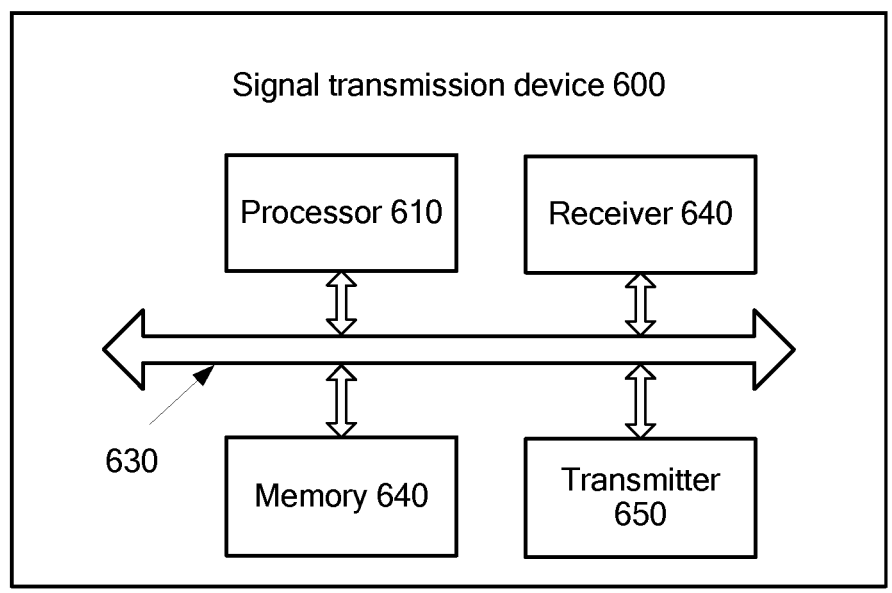
FIG. 10 shows a schematic block diagram of a signal transmission device according to still another embodiment of the present invention.

As shown in FIG. 10, an embodiment of the present invention further provides a signal transmission device 600. The device 600 includes a processor 610, a memory 620, a bus system 630, a receiver 640, and a transmitter 650. The processor 610, the memory 620, the receiver 640, and the transmitter 650 are connected to each other by using the bus system 630, the memory 620 is configured to store an instruction, and the processor 610 is configured to execute the instruction stored in the memory 620 to control the receiver 640 to receive a signal and control the transmitter 650 to send a signal. The processor 610 is configured to determine a target precoding matrix V, where $V=(H)^{-1}\cdot\tilde{H}$, H indicates a channel matrix between a sending device and the device, $\tilde{H}$ indicates an equivalent channel matrix between the sending device and the device, $\tilde{H}$ meets that $(\tilde{H}^H\cdot\tilde{H})$ or $(\tilde{H}\cdot\tilde{H}^H)$ is a diagonal matrix, and $\tilde{H}$ is related to a transmission distance D between the sending device and the device and an element spacing of an antenna of the device. The transmitter 650 is configured to send, to the sending device, an indication message used to indicate the target precoding matrix V, so that the sending device sends a signal to the device according to the target precoding matrix V.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

Optionally, in this embodiment of the present invention, the processor 610 is specifically configured to determine $\tilde{H}$ according to the transmission distance D and the element spacing of the antenna of the device, and determine the target precoding matrix V according to $\tilde{H}$ and H.

Optionally, in this embodiment of the present invention, the processor 610 is specifically configured to determine an equivalent element spacing of an antenna of the sending device according to the transmission distance D and the element spacing of the antenna of the device, and determine $\tilde{H}$ according to the equivalent element spacing of the antenna of the sending device, the element spacing of the antenna of the device, and the transmission distance D.

Optionally, in this embodiment of the present invention, the processor 610 is specifically configured to determine an equivalent element spacing $s_g$ of the antenna of the sending device according to the transmission distance D and the element spacing of the antenna of the device, and $s_g$ meets the following formula:

$$s_g s_2 = \left(p + \frac{1}{\max(N_t, N_r)}\right) \frac{D\lambda}{\sin\theta \sin\omega} \quad (3)$$

$s_2$ is the element spacing of the antenna of the device, D is the transmission distance D, P is a constant, $\lambda$ is a wavelength, $N_t$ is a quantity of elements included in the antenna of the sending device, $N_r$ is a quantity of elements included in the antenna of the device, $\theta$ indicates an angle between the antenna of the sending device and a projection that is of the antenna of the sending device and that is on a reference plane, and $\omega$ indicates an angle between the antenna of the device and a projection that is of the antenna of the device and that is on the reference plane.

Optionally, in this embodiment of the present invention, the receiver 640 is configured to: before the processor 610 determines $\tilde{H}$ according to the transmission distance D and the element spacing of the antenna of the device, receive an indication message that is sent by the sending device and that is used to indicate the transmission distance D.

Optionally, in this embodiment of the present invention, the processor 610 is specifically configured to determine the target precoding matrix V from N precoding matrices included in a preset codebook, where an $i^{th}$ precoding matrix $V_i$ in the N precoding matrices meets $V_i = (H_i)^{-1} \cdot \tilde{H}_i$, where $H_i$ indicates a channel matrix between a transmit end device and a receive end device, $\tilde{H}_i$ indicates an equivalent channel matrix between the transmit end device and the receive end device, $\tilde{H}_i$ meets that $((\tilde{H}_i)^H \cdot \tilde{H}_i)$ or $(\tilde{H}_i \cdot (\tilde{H}_i)^H)$ is a diagonal matrix, $\tilde{H}_i$ is related to a transmission distance between the transmit end device and the receive end device and an element spacing of an antenna of the receive end device, i is 1, 2, ..., or N, and N is a positive integer.

Optionally, in this embodiment of the present invention, the preset codebook is divided into M codebook subsets according to the transmission distance between the transmit end device and the receive end device, different codebook subsets are corresponding to different transmission distances, each codebook subset includes one or more precoding matrices in the N precoding matrices, different codebook subsets include different precoding matrices, and M is an integer less than or equal to N.

Optionally, in this embodiment of the present invention, the processor 610 is specifically configured to: determine a target codebook subset from the M codebook subsets, where an absolute value of a difference between a transmission distance corresponding to the target codebook subset and the transmission distance D between the sending device and the device is less than a preset threshold; and determine, according to the channel matrix H, the target precoding matrix V from one or more precoding matrices included in the target codebook subset.

Optionally, in this embodiment of the present invention, the processor 610 is specifically configured to determine the target codebook subset from the M codebook subsets according to the transmission distance D between the sending device and the device and transmission distances corresponding to different codebook subsets in the M codebook subsets, where the absolute value of the difference between the transmission distance corresponding to the target codebook subset and the transmission distance D is less than the preset threshold; or the processor 610 is specifically configured to determine the target codebook subset from the M codebook subsets according to an indication message that is sent by the sending device and that is used to indicate the target codebook subset.

Optionally, in this embodiment of the present invention, the processor 610 is specifically configured to determine, according to the channel matrix H and from the one or more precoding matrices included in the target codebook subset, the target precoding matrix V based on at least one criterion in the following preset criteria: a channel capacity maximization criterion, a channel throughput maximization criterion, or a channel chordal distance minimization criterion.

Optionally, in this embodiment of the present invention, a rank of each precoding matrix in the N precoding matrices in the preset codebook is at least 2.

Optionally, in this embodiment of the present invention, the transmission distance D between the sending device and the device is a distance between a central location of the antenna of the sending device and a central location of the antenna of the device.

It should be understood that in this embodiment of the present invention, the processor 610 may be a central processing unit (Central Processing Unit, "CPU" for short), or the processor 610 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor or the processor may be any conventional processor, or the like.

The memory 620 may include a read-only memory and a random access memory, and provides an instruction and data for the processor 610. A part of the memory 620 may further include a non-volatile random access memory. For example, the memory 620 may further store information about a device type.

In addition to a data bus, the bus system 630 may further include a power bus, a control bus, a status signal bus, and the like. However, for clarity of description, various buses are marked as the bus system 630 in the figure.

In an implementation process, the steps in the foregoing method may be completed by using an integrated logic circuit of hardware in the processor 610 or an instruction in a form of software. Steps of the methods disclosed with reference to the embodiments of the present invention may be directly executed and completed by a hardware processor, or may be executed and completed by using a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 620. The processor 610 reads information in the memory 620, and completes the steps of the foregoing method in combination with hardware of the processor 610. To avoid repetition, details are not described herein again.

It should be understood that the signal transmission device 600 according to this embodiment of the present invention may be corresponding to a receiving device in a signal transmission method according to an embodiment of the present invention, and may be corresponding to the signal transmission device 400 according to the embodiment of the present invention, and the foregoing and other operations and/or functions of the modules of the device 600 are respectively used to implement corresponding procedures of the methods in FIG. 1 to FIG. 6. For brevity, details are not described herein again.

Therefore, in this embodiment of the present invention, a target precoding matrix V is determined, where $V=(H)^{-1}\cdot\tilde{H}$, H indicates a channel matrix between a sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance between the sending device and the receiving device and an element spacing of an antenna of the receiving device. It should be understood that because $\tilde{H}$ meets a characteristic that $(\tilde{H}^H\cdot\tilde{H})$ or $(\tilde{H}\cdot\tilde{H}^H)$ is a diagonal matrix, a channel corresponding to $\tilde{H}$ can support multiple data stream transmission. That the sending device sends a signal to the receiving device based on the target precoding matrix V may be equivalent to that the sending device transmits a signal to the receiving device based on the channel corresponding to the equivalent channel matrix $\tilde{H}$. Therefore, multiple data stream transmission between the sending device and the receiving device can be supported. Therefore, the signal transmission device provided in this embodiment of the present invention can support multiple data stream transmission in a direct path condition.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or at least two units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal transmission method, comprising:
   determining, by a sending device, a target precoding matrix V, wherein $V=(H)^{-1}\cdot\tilde{H}$, H indicates a channel matrix between the sending device and a receiving device, $\tilde{H}$ indicates an equivalent channel matrix between the sending device and the receiving device, $(\tilde{H}^H\cdot\tilde{H})$ or $(\tilde{H}\cdot\tilde{H}^H)$ is a diagonal matrix, and $\tilde{H}$ is related to a transmission distance D between the sending device and the receiving device and an element spacing of an antenna of the receiving device;

sending, by the sending device, a signal to the receiving device according to the target precoding matrix V; and implementing multiple data stream transmission between the sending device and the receiving device.

2. The method according to claim 1, wherein the determining, by a sending device, a target precoding matrix V comprises:

determining, by the sending device, the equivalent channel matrix $\tilde{H}$ according to the transmission distance D and the element spacing of the antenna of the receiving device; and determining, by the sending device, the target precoding matrix V according to H and $\tilde{H}$.

3. The method according to claim 2, wherein the determining, by the sending device, the equivalent channel matrix $\tilde{H}$ according to the transmission distance D and the element spacing of the antenna of the receiving device comprises:

determining, by the sending device, an equivalent element spacing of an antenna of the sending device according to the transmission distance D and the element spacing of the antenna of the receiving device; and determining, by the sending device, the equivalent channel matrix $\tilde{H}$ according to the equivalent element spacing of the antenna of the sending device, the element spacing of the antenna of the receiving device, and the transmission distance D.

4. The method according to claim 3, wherein the determining, by the sending device, an equivalent element spacing of an antenna of the sending device according to the transmission distance D and the element spacing of the antenna of the receiving device comprises:

determining, by the sending device, an equivalent element spacing $s_g$ of the antenna of the sending device according to the transmission distance D and the element spacing of the antenna of the receiving device, wherein $s_g$ meets the following formula:

$$s_g s_2 = \left(p + \frac{1}{\max(N_t, N_r)}\right) \frac{D\lambda}{\sin\theta\sin\omega},$$

wherein $s_2$ is the element spacing of the antenna of the receiving device, D is the transmission distance D, P is a constant, $\lambda$ is a wavelength, $N_t$ is a quantity of elements included in the antenna of the sending device, $N_r$ is a quantity of elements included in the antenna of the receiving device, $\theta$ indicates an angle between the antenna of the sending device and a projection that is of the antenna of the sending device and that is on a reference plane, and $\omega$ indicates an angle between the antenna of the receiving device and a projection that is of the antenna of the receiving device and that is on the reference plane.

5. The method according to claim 2, wherein before the determining, by the sending device, the equivalent channel matrix $\tilde{H}$ according to the transmission distance D and the element spacing of the antenna of the receiving device, the method further comprises:

receiving, by the sending device, an indication message that is sent by the receiving device and that is used to indicate the transmission distance D.

6. A signal transmission method, comprising:

determining, by a receiving device, a target precoding matrix V, wherein V=(H)$^{-1}\cdot\tilde{H}$, H indicates a channel matrix between a sending device and the receiving device, $\tilde{H}$ indicates an equivalent channel matrix between the sending device and the receiving device, $\tilde{H}$ meets that ($\tilde{H}^H\cdot\tilde{H}$) or ($\tilde{H}\cdot\tilde{H}^H$) is a diagonal matrix, and $\tilde{H}$ is related to a transmission distance D between the sending device and the receiving device and an element spacing of an antenna of the receiving device; and sending, by the receiving device to the sending device, an indication message used to indicate the target precoding matrix V, so that the sending device sends a signal to the receiving device according to the target precoding matrix V; and implementing multiple data stream transmission between the sending device and the receiving device.

7. The method according to claim 6, wherein the determining, by a receiving device, a target precoding matrix V comprises:

determining, by the receiving device, $\tilde{H}$ according to the transmission distance D and the element spacing of the antenna of the receiving device; and determining, by the receiving device, the target precoding matrix V according to $\tilde{H}$ and H.

8. The method according to claim 7, wherein the determining, by the receiving device, $\tilde{H}$ according to the transmission distance D and the element spacing of the antenna of the receiving device comprises:

determining, by the receiving device, an equivalent element spacing of an antenna of the sending device according to the transmission distance D and the element spacing of the antenna of the receiving device; and determining, by the receiving device, $\tilde{H}$ according to the equivalent element spacing of the antenna of the sending device, the element spacing of the antenna of the receiving device, and the transmission distance D.

9. The method according to claim 8, wherein the determining, by the receiving device, an equivalent element spacing of an antenna of the sending device according to the transmission distance D and the element spacing of the antenna of the receiving device comprises:

determining, by the receiving device, an equivalent element spacing $s_g$ of the antenna of the sending device according to the transmission distance D and the element spacing of the antenna of the receiving device, wherein $s_g$ meets the following formula:

$$s_g s_2 = \left(p + \frac{1}{\max(N_t, N_r)}\right) \frac{D\lambda}{\sin\theta\sin\omega},$$

wherein $s_2$ is the element spacing of the antenna of the receiving device, D is the transmission distance D, P is a constant, $\lambda$ is a wavelength, $N_t$ is a quantity of elements included in the antenna of the sending device, $N_r$ is a quantity of elements included in the antenna of the receiving device, $\theta$ indicates an angle between the antenna of the sending device and a projection that is of the antenna of the sending device and that is on a reference plane, and $\omega$ indicates an angle between the antenna of the receiving device and a projection that is of the antenna of the receiving device and that is on the reference plane.

10. The method according to claim 7, wherein before the determining, by the receiving device, $\tilde{H}$ according to the transmission distance D and the element spacing of the antenna of the receiving device, the method further comprises:

receiving, by the receiving device, an indication message that is sent by the sending device and that is used to indicate the transmission distance D.

11. A signal transmission device, comprising:
a processor, configured to determine a target precoding matrix V, wherein $V=(H)^{-1}\cdot\tilde{H}$, H indicates a channel matrix between the device and a receiving device, $\tilde{H}$ indicates an equivalent channel matrix between the device and the receiving device, $(\tilde{H}^H\cdot\tilde{H})$ or $(\tilde{H}\cdot\tilde{H}^H)$ is a diagonal matrix, and $\tilde{H}$ is related to a transmission distance D between the device and the receiving device and an element spacing of an antenna of the receiving device; and
a transmitter, configured to send a signal to the receiving device according to the target precoding matrix V determined by the processor; and
the processor is further configured to implement multiple data stream transmission between the device and the receiving device.

12. The device according to claim 11, wherein the processor, further configured to determine the equivalent channel matrix $\tilde{H}$ according to the transmission distance D and the element spacing of the antenna of the receiving device; and
the processor, further configured to determine the target precoding matrix V according to $\tilde{H}$ determined by the processor and H.

13. The device according to claim 12, wherein the processor, further configured to determine an equivalent element spacing of an antenna of the device according to the transmission distance D and the element spacing of the antenna of the receiving device; and
the processor, further configured to determine the equivalent channel matrix $\tilde{H}$ according to the equivalent element spacing that is of the antenna of the device and that is determined by the processor, the element spacing of the antenna of the receiving device, and the transmission distance D.

14. The device according to claim 13, wherein the processor is further configured to determine an equivalent element spacing $s_g$ of the antenna of the device according to the transmission distance D and the element spacing of the antenna of the receiving device, and $s_g$ meets the following formula:

$$s_g s_2 = \left(p + \frac{1}{\max(N_t, N_r)}\right)\frac{D\lambda}{\sin\theta\sin\omega},$$

wherein
$s_2$ is the element spacing of the antenna of the receiving device, D is the transmission distance D, P is a constant, $\lambda$ is a wavelength, $N_t$ is a quantity of elements included in the antenna of the device, $N_r$ is a quantity of elements included in the antenna of the receiving device, $\theta$ indicates an angle between the antenna of the device and a projection that is of the antenna of the device and that is on a reference plane, and $\omega$ indicates an angle between the antenna of the receiving device and a projection that is of the antenna of the receiving device and that is on the reference plane.

15. The device according to claim 12, wherein the receiver, further configured to: before the processor determines the equivalent channel matrix $\tilde{H}$, receive an indication message that is sent by the receiving device and that is used to indicate the transmission distance D.

16. A signal transmission device, comprising:
a processor, configured to determine a target precoding matrix V, wherein $V=(H)^{-1}\cdot\tilde{H}$, H indicates a channel matrix between a sending device and the device, $\tilde{H}$ indicates an equivalent channel matrix between the sending device and the device, $\tilde{H}$ meets that $(\tilde{H}^H\cdot\tilde{H})$ or $(\tilde{H}\cdot\tilde{H}^H)$ is a diagonal matrix, and $\tilde{H}$ is related to a transmission distance D between the sending device and the device and an element spacing of an antenna of the device;
a transmitter, configured to send, to the sending device, an indication message used to indicate the target precoding matrix V determined by the processor; and
the processor is further configured to implement multiple data stream transmission between the sending device and the device.

17. The device according to claim 16, wherein the processor, further configured to determine $\tilde{H}$ according to the transmission distance D and the element spacing of the antenna of the device; and
the processor, further configured to determine the target precoding matrix V according to $\tilde{H}$ determined by the processor and H.

18. The device according to claim 17, wherein the processor, further configured to determine an equivalent element spacing of an antenna of the sending device according to the transmission distance D and the element spacing of the antenna of the device; and
the processor, further configured to determine $\tilde{H}$ according to the equivalent element spacing that is of the antenna of the sending device and that is determined by the processor, the element spacing of the antenna of the device, and the transmission distance D.

19. The device according to claim 18, wherein the processor is further configured to determine an equivalent element spacing $s_g$ of the antenna of the sending device according to the transmission distance D and the element spacing of the antenna of the device, and $s_g$ meets the following formula:

$$s_g s_2 = \left(p + \frac{1}{\max(N_t, N_r)}\right)\frac{D\lambda}{\sin\theta\sin\omega},$$

wherein
$s_2$ is the element spacing of the antenna of the device, D is the transmission distance D, P is a constant, $\lambda$ is a wavelength, $N_t$ is a quantity of elements included in the antenna of the sending device, $N_r$ is a quantity of elements included in the antenna of the device, $\theta$ indicates an angle between the antenna of the sending device and a projection that is of the antenna of the sending device and that is on a reference plane, and $\omega$ indicates an angle between the antenna of the device and a projection that is of the antenna of the device and that is on the reference plane.

20. The device according to claim 17, wherein the device further comprises:
a receiver, configured to: before the processor determines $\tilde{H}$, receive an indication message that is sent by the sending device and that is used to indicate the transmission distance D.

* * * * *